(12) United States Patent
Yamashita et al.

(10) Patent No.: US 6,755,743 B1
(45) Date of Patent: Jun. 29, 2004

(54) COMMUNICATION GAME SYSTEM AND PROCESSING METHOD THEREOF

(75) Inventors: Nobuyuki Yamashita, Tokyo (JP); Masanori Satou, Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 95 days.

(21) Appl. No.: 09/653,947

(22) Filed: Sep. 1, 2000

(30) Foreign Application Priority Data

Dec. 8, 1999 (JP) .......................................... 11-349521

(51) Int. Cl.[7] .......................... G06F 17/00; G06F 19/00
(52) U.S. Cl. ........................................ 463/42; 463/40
(58) Field of Search ................................ 463/40–42, 1

(56) References Cited

U.S. PATENT DOCUMENTS

| | | | | |
|---|---|---|---|---|
| 5,546,521 A | * | 8/1996 | Martinez | 345/711 |
| 5,558,339 A | * | 9/1996 | Perlman | 463/42 |
| 5,971,849 A | * | 10/1999 | Falciglia | 463/16 |
| 5,971,879 A | * | 10/1999 | Westhoff | 474/260 |
| 5,984,786 A | * | 11/1999 | Ehrman | 463/42 |
| 6,009,458 A | * | 12/1999 | Hawkins et al. | 709/203 |
| 6,128,660 A | * | 10/2000 | Grimm et al. | 709/227 |
| 6,179,713 B1 | * | 1/2001 | James et al. | 463/42 |
| 6,253,167 B1 | * | 6/2001 | Matsuda et al. | 703/11 |
| 6,301,609 B1 | * | 10/2001 | Aravamudan et al. | 709/207 |
| 6,496,851 B1 | * | 12/2002 | Morris et al. | 709/204 |

OTHER PUBLICATIONS

Cavoukian, Ann. "How to fight Spam". Privacy Journal. Providence, Jan. 1999.*

* cited by examiner

Primary Examiner—Teresa Walberg
Assistant Examiner—Julie Brocketti
(74) Attorney, Agent, or Firm—Finnegan, Henderson, Farabow, Garrett & Dunner, L.L.P.

(57) ABSTRACT

This communication game system comprises a client system 1 and a game server system 2 for communicating with the client system 1. The game server system 2 comprises a database 21 for storing group information which relates a plurality of client systems to each other as a battle group. The game server system 2 is structured to decide a battle combination among the client systems 1 belonging to the same battle group, to perform a battle by managing the sending and receiving of data between the client systems determined by the above-mentioned combination, and to decide the next combination in accordance with the results of the battle. Each client system 1 has its own character select function and chat function when watching games.

4 Claims, 31 Drawing Sheets

FIG.28

[ PAD DATA FORMAT ]

| 0 | LEFT STICK UP |
|---|---|
| 1 | LEFT STICK DOWN |
| 2 | LEFT STICK TO THE LEFT |
| 3 | LEFT STICK TO THE RIGHT |
| 4 | RIGHT STICK UP |
| 5 | RIGHT STICK DOWN |
| 6 | LEFT STICK UP |
| 7 | LEFT STICK DOWN |
| 8 | LEFT TURBO |
| 9 | LEFT SHOT |
| 10 | RIGHT TURBO |
| 11 | RIGHT SHOT |
| 12 | START |
| 13 | SEPCIAL PLAY BUTTON |
| 14 | TWIN STICKS |
| 15 | FINISH THE CUSTOMIZATION SELECTION |

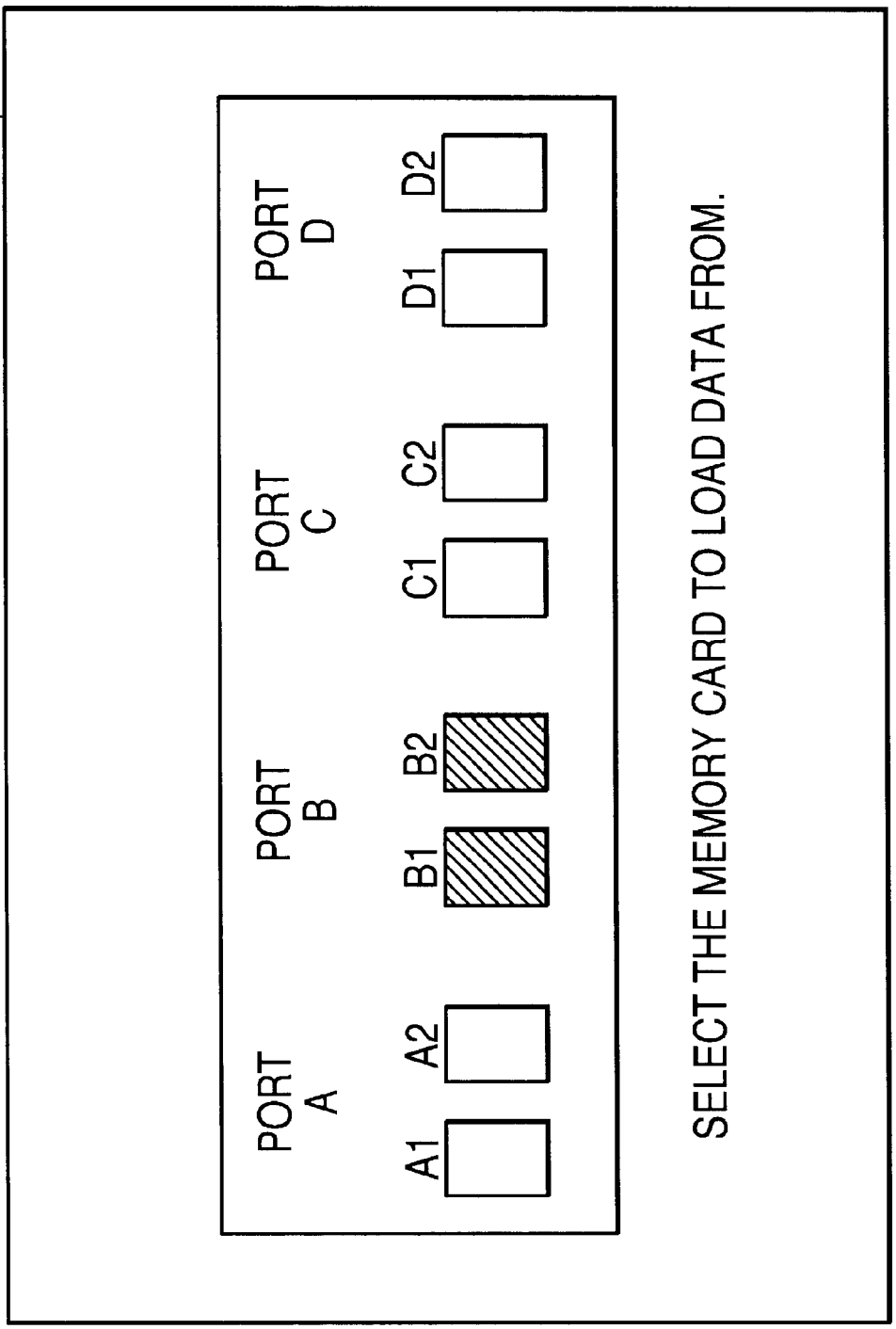

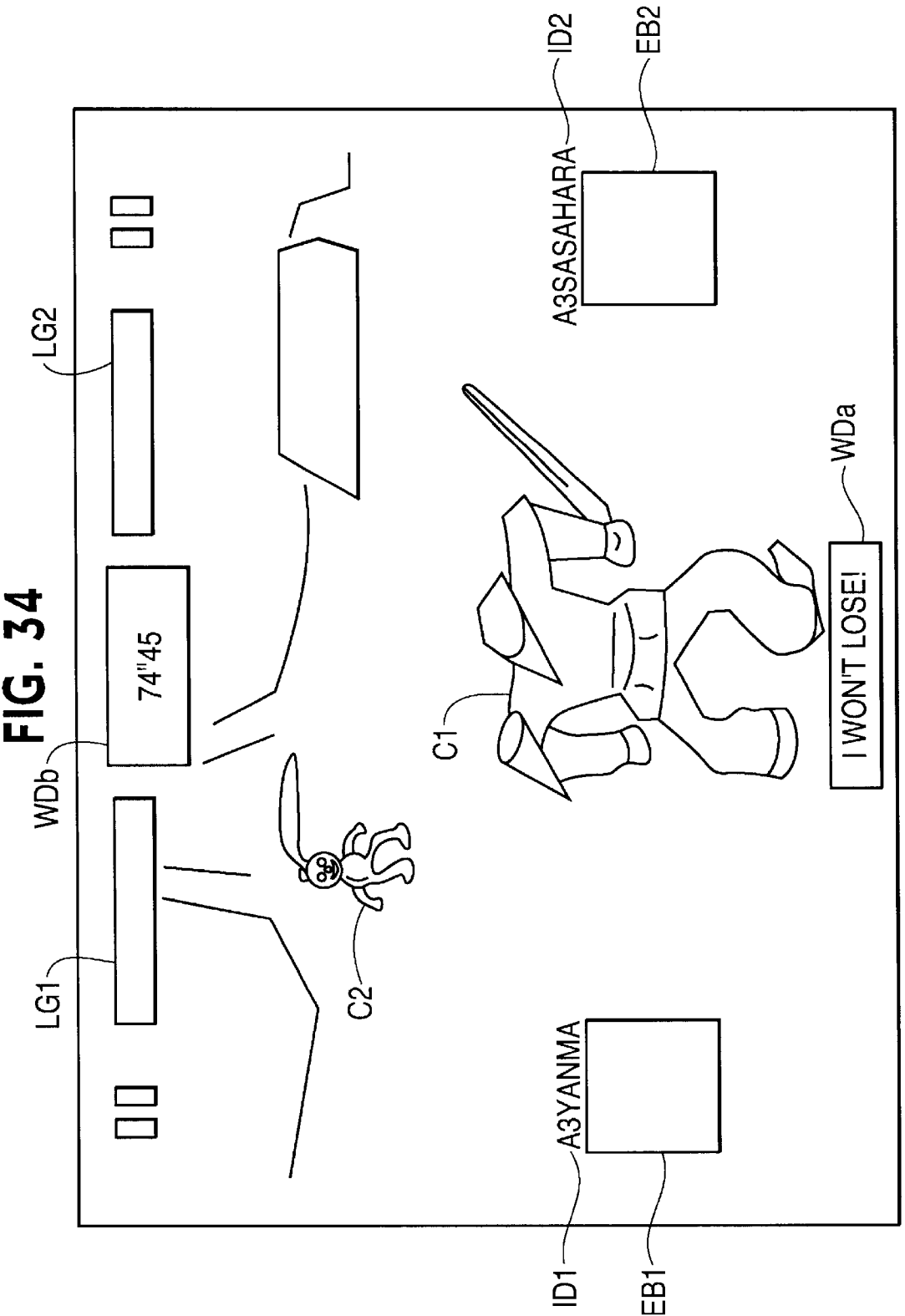

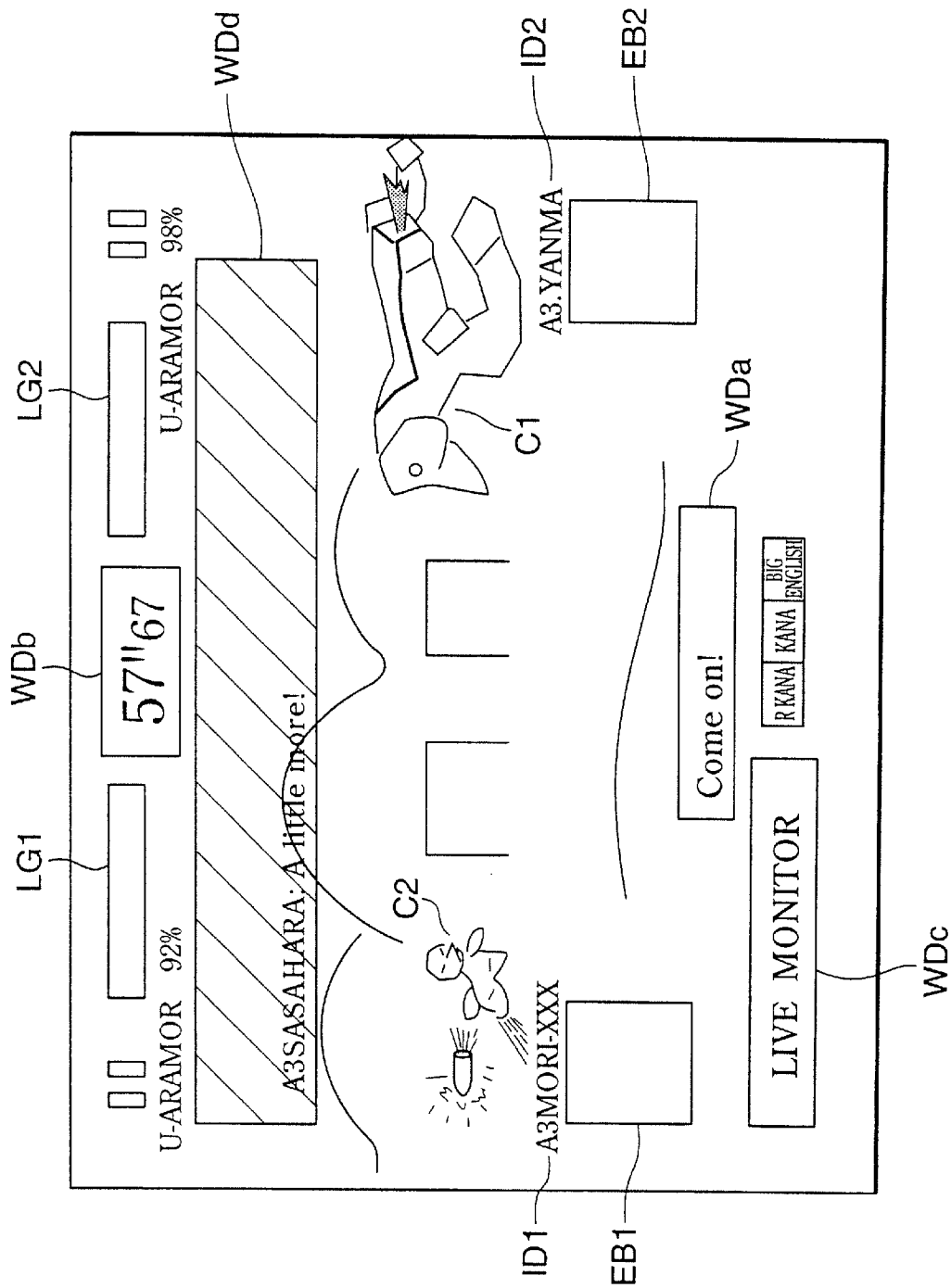

COMMUNICATION GAME SYSTEM AND PROCESSING METHOD THEREOF

BACKGROUND OF THE INVENTION

1. Field of the Invention

The present invention relates to a communication game system which enables game battles among remote game devices which are being connected to a server. More particularly, the communication game system of this invention provides a new communication game control method by providing such functions that enable complicated battle control within groups that are formed at the request of players, selection of characters to be used in the game with no sense of abnormality, and broadened communications among the game audience.

2. Description of the Related Art

There have been communication game systems in which game devices operated by different players are connected to a common game server and battle games among remote players are made possible.

In these systems, the server is designed to list and display the game devices that are being connected to it at the moment. The server is programmed in such a way that when any of the game devices challenge another game device to a battle, the server controls the transactions of the battle acceptance between the challengers and when the battle is accepted, the server monitors the sending and receiving of commands between the game devices and intermediates the game devices.

In conventional systems, when a competitor is determined, a common screen for selecting the player's own characters to use in the battle game is displayed on the competing game devices. The players select their favorite characters from the common screen on each of their game devices. This selection information is sent and received between the players in real time via the server. Accordingly, the character selection information of both the players is displayed on the common character selection screen.

Furthermore, conventional systems are designed in such a manner that competitors can send messages to each other while battling game.

The appearance of such communication game systems have enabled players to enjoy playing game battles with other players.

However, in the battle method of the conventional communication game systems, transactions including applications for game battles, acceptance thereof, and battles are only repeated. Although it is possible to play battles with a multiplicity of game devices, it is impossible to realize such communications as people have in playing games with a plurality of friends at amusement arcades. Moreover, since the way of playing games with such game systems has no potential for development, players tend to easily become bored.

Among the competing game devices, the character selection information is displayed in real time mutually also on the competitor's side. Accordingly, it is possible to find out in advance what character the competitor has selected, thereby losing the excitement of the game.

On the other hand, in the circumstances where the character selection screen provides a mode for selecting customized characters, a screen only for the selection of the customized characters is displayed on the game device which has designated the selection of the customized characters. Namely, at this point, different character selection screens are displayed on the competitors' devices. If in this situation manual operations to select a customized character are performed on one game device, the movement of a cursor in relation to such operations is transmitted to the other game device, thereby causing a cursor of the other game device to move incomprehensibly on the screen which is not the screen for the selection of the customized characters, and this action seems strange to the other party. On the contrary, if the competitors know the other party's strategy each other, the movement of the other party's cursor gives a hint to which customized character will be selected, thereby losing the excitement of the game as described above.

Moreover, with conventional communication game systems, it is possible to exchange messages between competitors, thereby enabling players to enjoy the game. However, game watching parties can do nothing but watch the game which is being played, including the messages. Accordingly, as described above, it is impossible to realize the situation where a player plays games with a plurality of friends at amusement arcades, thereby resulting in the problem in that the players easily become bored.

SUMMARY OF THE INVENTION

In consideration of the above-described problems, it is an object of this invention to provide a communication game system and its processing method which will facilitate communications between players and make communication games more entertaining by providing a wide variety of ways to play a game that have not been provided by the conventional communication game systems.

It is another object of this invention to provide a communication game system and its processing method which will make communication games more entertaining by facilitating such communications between game watching parties as have not been provided by the conventional game systems.

It is still another object of this invention to provide a communication game system and its processing method which will not give a sense of abnormality in the operations of the selection of characters to be used in a battle game and which prevents a player from becoming bored with the game.

In order to achieve these objects, it is necessary to satisfy a demand to play with those who can be called friends of kindred spirits on the network in the communication game environment where a multiplicity of any persons participate.

It is also necessary to satisfy a demand to enable the evaluation of a player's own skills in a variety of battle combinations such as team battles, round-robin battles, and tournament battles that are normally performed in games and competitions where many people participate.

Even if a player himself is not fighting in a battle, it is necessary to satisfy a demand to enjoy watching the battles of other players.

Moreover, in the selection of battle characters on the screen, it is necessary to satisfy a demand to enjoy playing a game without giving a feeling of abnormality and without losing the excitement of the game.

This invention is a communication game system comprising client systems and a game server system for communicating with the client systems, wherein the game server system comprises a database which stores, according to several kinds of battle modes, group information for relating a plurality of client systems to each other as one battle group, and wherein when any one battle group is designated, the game server system is configured so as to refer to the group information related to the designated battle group, to decide a battle combination among the client systems belonging to the same battle group, to perform the battle by managing the sending and receiving of data between the client systems to be determined according to the combination, and then to decide the next combination in accordance with the results of the battle.

For example, at least one of the group information stored in the database contains game rule information for setting up a battle mode designed to enable a winner, a loser, both fixed client systems, or either one of the fixed client systems to continue playing battles against other client systems when a battle is over. When the battle is over, the game server system decides the next battle combination by referring to the game rule information. When an acceptance command is sent from both client systems corresponding to the next battle combination, the game server system performs the battle.

For example, at least one of the group information stored in the database stores schedule information for setting up a team battle mode in which one battle group is divided into two subgroups. When a battle is over, the game server system refers to the schedule information and decides the next battle combination by selecting the winner client system as a result of the battle and the other client system which belongs to the subgroup of the loser client system and which has not played a battle. Preferably, this schedule information has a previously set battle order within the subgroup, and when the last client system surviving in either one of the subgroups loses a battle, the game server system reports the results of the relevant team battle to each client system.

For example, at least one of the group information stored in the database stores registration information for setting up a round-robin battle mode in which the client systems are ordered in such a manner that when a battle is over, one client system plays battles against all the other client systems in the same battle group. When a battle of one combination is over, the game server system refers to the registration information and decides the next battle combination by selecting, for each client system, another client system against which the former client system has not yet played a battle, and which is not battling. Preferably, when battles of all the combinations are over, the game server system reports the results of the round-robin battles as a score sheet to each client system.

For example, at least one of the group information stored in the database stores registration information to set up a tournament battle mode for playing battles in a tournament style within the same battle group when a battle is over. When a battle of one combination is over, the game server system decides battle combinations by referring to the registration information and decides the next battle combination by selecting the winning client systems in the battles of the decided combinations. Preferably, when one client system wins its way to the final battle in the tournament, the game server system reports the results of the tournament as a tournament sheet.

This invention is characterized in that when any of the client systems makes a battle request, the game server system selects and executes either an easy battle mode in which any one of the other client systems is selected to battle, or an expert battle mode in which the client system belongs to any one of the battle groups and plays battles within each battle group.

For example, the game server system provides each client system with a battle mode menu for having each client system browse battle groups by referring to the group information. When any battle group is selected among the client systems in the battle mode menu, this game server system reads the group information corresponding to the selected battle group from the database and displays the content of such group information.

Preferably, the database stores battle history information of the client systems belonging to any of the battle groups, and when any client system is selected among the client systems in the battle mode menu, the game server system reads the battle history information corresponding to the selected client system and displays such battle history information.

Preferably, when a battle combination within the battle group is to be decided, the game server system determines the combination possibilities according to the degree of strength which is judged according to the battle history information of each client system.

Preferably, when a battle combination within the battle group is to be decided, the game server system handicaps each client system according to the battle history information, and in the case of a battle of such handicapped combination, the update of the battle history information as a result of the battle is prohibited.

More preferably, the game system comprises a WWW server system connected to the wide area network, and the game server system creates a file for displaying battle history on the basis of the battle history information and stores the file in a storage area of the WWW server system in such a state that the file can be read by a computer.

According to this invention, when any of the client systems request the creation of a new battle group, the game server system newly registers new group information with the database on the basis of the settings of the client system.

Moreover, when any of the client systems request the participation in any of the battle groups, the game server system of this invention relates the client system to the group information of the battle group for which the participation request is made.

The game server system of this invention sends and receives battle data to and from the client systems which are fighting within the battle group, while it sends to and receives from the client systems, which are not fighting within the battle group, battle watching data for watching battles between the fighting client systems.

Preferably, the database has associating information to associate a message, which during a battle each client system wants to give to the watching client systems, with the operations of a game player. When any of the client systems is fighting a battle, the game server system refers to the operations of the client system, reads the associating information associated with the operations, and reports such associating information to the watching client systems.

Similarly, when any of the client systems is fighting a battle and when a message is sent from a watching client system, the game server system reports the message to other client systems.

Moreover, the client system comprises a vibration generating means for transmitting vibrations to a game player in response to a command from the game server system, and the game server system sends to other client systems a command to drive the vibration generating means in accordance with the operations of any of the client systems. There is no limitation to the "vibration generation means" and any kind of such means can be applied, including those using piezoelectric elements or those using eccentric motors.

Specifically, the game server system of this invention comprises: database for associating a plurality of client systems as a battle group; a communication device for sending and receiving data to and from each client system; and a processor for managing game battles between a plurality of client systems within the same battle group by referring to the database.

A communication game processing method of this invention is performed between a client system and a game server system communicating with the client system, and the method is characterized in that it comprises the steps of: the game server system's referring to a database storing a plurality of group information which correspond to several kinds of battle modes and which associate a plurality of client systems as one battle group; when any one of the battle groups is designated, referring to the group information associated to the designated battle group and deciding a battle combination among the client systems belonging to the same battle group; performing a battle by managing the sending and receiving of data between the client systems decided by the combination; and deciding the next combination in accordance with the results of the battle.

At least one of the group information stored in the database contains game rule information to set up such battle mode in which it is set forth that when a battle is over, a winner, a loser, both fixed client systems, or either one of the fixed client systems continues to fight a battle with other client systems. In the step of deciding the next combination, when the battle is over, reference is made to the game rule information, thereby deciding the next battle combination.

At least one of the group information stored in the database stores schedule information to set up a team battle mode in which one battle group is divided into two subgroups. In the step of deciding the next combination, when the battle is over, reference is made to the schedule information, thereby deciding, as the next battle combination, the winning client system as a result of the battle and another client system which belongs to the subgroup of the losing client system, and which has not fought a battle.

Moreover, at least one of the group information stored in the database stores registration information to set up a round-robin battle mode in which the client systems are ordered in such a manner that when a battle is over, one client system fights battles with all the other client systems in the same battle group. In the step of deciding the next combination, when a battle of one combination is over, the next battle combination for each client system is decided by selecting the other client system against which the former client system has not yet fought any battle, and which is not fighting.

At least one of the group information stored in the database stores registration information to set up a tournament battle mode in which when a battle is over, the client systems fight battles within the same battle group in a tournament style. In the step of deciding the next combination, when a battle of one combination is over, battle combinations are decided by referring to the registration information, and it is decided that the winners of the battles of the decided combinations are then to fight in the next battle combination.

Preferably, when any of the client systems request a battle, the method comprises the step of selecting and executing either an easy battle mode in which any one of the other client systems is selected to battle, or an expert battle mode in which the client system belongs to any of the battle groups and fights battles in each such battle group.

More preferably, the communication game processing method comprises the step of providing each client system with a battle mode menu for having each client system browse the battle groups by referring to the group information.

Such a communication game processing method may be provided through record media, such as CD-ROM, DVD, or communication lines, in a program format executable by the computer.

Another embodiment of this invention is a communication game system capable of sending and receiving data on a game in real time through the game server system between such client systems of the plurality of client systems, which have already decided on their competitors. Regarding each of the plurality of client systems, upon receiving and sending the data between the client systems, when one client system sends the data by including data to be nullified, the other client system applies the nullification process to the data to be nullified.

Preferably, each of the plurality of client systems comprises: a sending means for sending the data including the data to be nullified to the game server system; and a nullification processing means for nullifying the data to be nullified when the data to be nullified is sent from the game server system. For example, the sending means is the means for sending the data to be nullified together with information indicating the nullification.

The information indicating the nullification is, for example, positional information representing which display position on the screen corresponds to the data to be nullified. This information indicating the nullification may be a flag or dummy data representing the nullification.

Moreover, the data to be nullified is, for example, data on the details of the operation of a game player when he selects a customized character on a screen for selecting a game character. The data on the details of the operation is, for example, the data on the operations of a controller or a pad.

Preferably, each of the plurality of client systems comprises a means for presenting a screen, as a game character selection screen, including a first button for selecting a common character previously stored in the plurality of client systems, and a second button for shifting to a mode for selecting an uncommon customized character which can be stored by a memory device attachable to a desired client system, and the data to be nullified is data representing the operation state when the second button is selected.

Also preferably, the nullification processing means is the processing to read and nullify the data to be nullified by causing the data to be in a non-display state.

A system provided as still another embodiment of this invention is the system capable of sending and receiving data on a game in real time through the game server system between such client systems of the plurality of client systems, who have already decided their competitors, and the system is characterized in that when each of the plurality of client systems watches the game, the client system is capable of chatting with other client systems in the game watching state through the game server system.

Preferably, each of the plurality of client systems comprises: a sending means for receiving the content of the chat from a game player while watching the game and then sending character string information corresponding to the content to the game server system; and a display means for displaying the character string information by superposing it on a game screen on the monitor when the character string information is sent from the game server system. The display means is, for example, means for displaying the character string information in a semitransparent window which is set up on the background of the game screen on the monitor screen.

A further embodiment of this invention is a communication game system capable of sending and receiving data on a game in real time through the game server system between such client systems of the plurality of client systems, which have already decided on their competitors, and the system is characterized in that when each of the plurality of client systems watches the game, the client system displays an image of a game space, in which the game is performed, being projected from a changeable virtual visual point within the game space.

BRIEF DESCRIPTION OF THE DRAWINGS

FIG. 28 is a schematic diagram showing the data format configuration.

FIG. 33 is a diagram showing a customization mode selection screen at the time of the character selection.

FIG. 34 is a diagram illustrating a game screen for a competitor.

FIG. 35 is a diagram illustrating a game screen for an audience.

DETAILED DESCRIPTION OF THE PREFERRED EMBODIMENTS

The preferred embodiments of this invention are hereinafter explained with reference to the attached drawings.

Embodiment 1

Embodiment 1 of this invention relates to a communication game system in which client systems form a battle group, a battle combination is determined from the client systems belonging to the same battle group, and the winner, loser, or both fixed players, or either one of the fixed players continues to battle with the other client systems.

Figure 1:
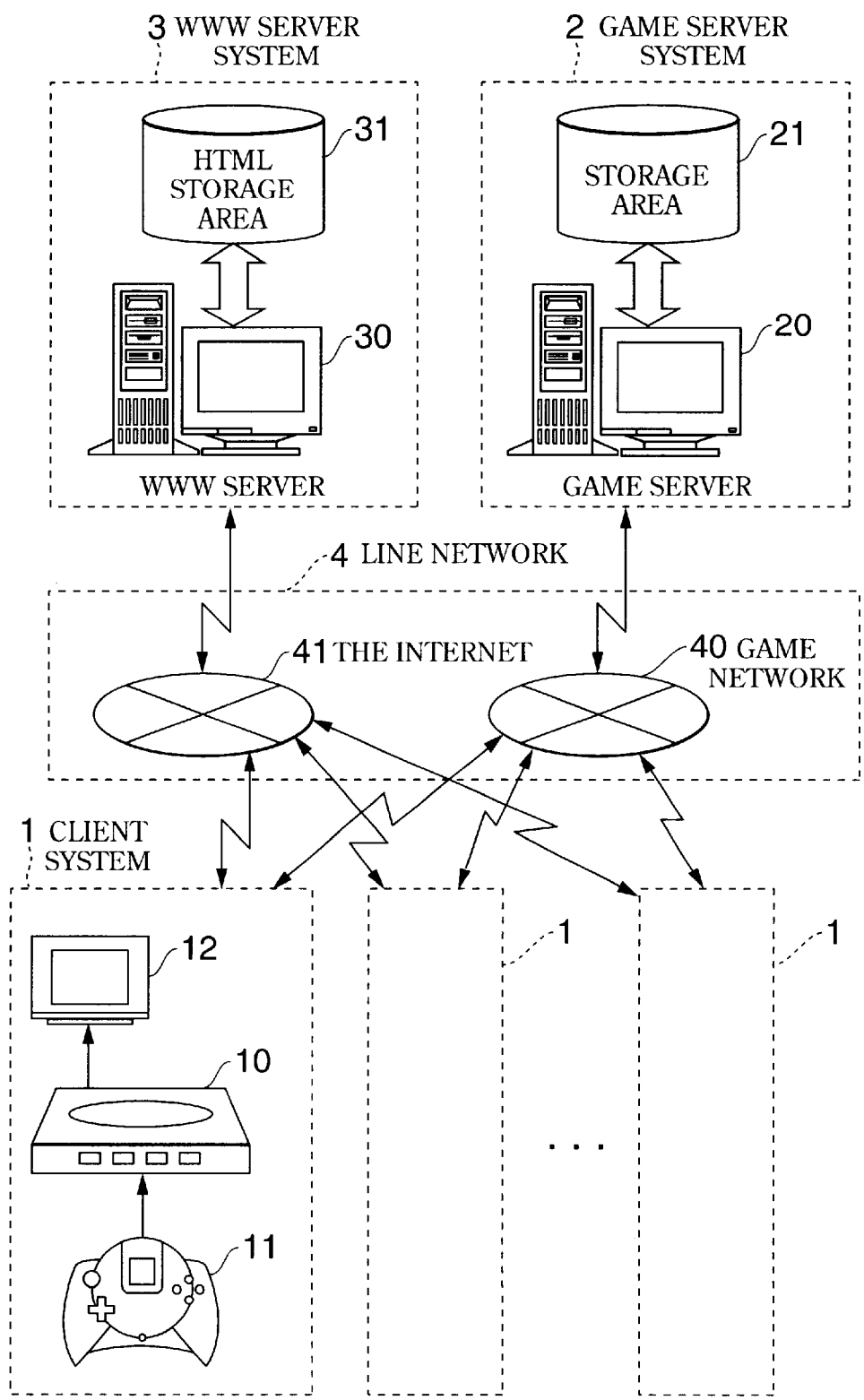
FIG. 1 is a system configuration of a communication game system of this invention.

FIG. 1 is a system diagram of a communication game system of this invention.

The communication game system is configured, as shown in FIG. 1, in such a way that a plurality of client systems 1 are connected to a game server system 2 and a WWW server system 3 through a line network 4.

Each client system 1 has a configuration as a game device with so-called communication functions and is configured in such a way that a main game device 10, a control pad 11, and a monitor 12 are interconnected.

The control pad 11 provides the main game device with operation signals output by the operations of each player. The main game device 10 has configurations as a computer device capable of conducting communications by including, for example, a CPU, a memory, a CD-ROM drive, a modem, an image-generating circuit, and an audio-generating circuit. The main game device 10 can read data from recording media such as CD-ROM's and operates as a client system of the communication game system by running a game program read from the recording medium. The main game device 10 proceeds the game processing based on the operation signals from the control pad 11 and connects to the game server system 2 via the line network 4 through a built-in modem when the communication game is specified by the player. As long as the game program recorded on the recording medium can perform communication game functions, there is no restriction on the contents of the game. However, it is preferable that the game be programmed as a battle type game in which the player battles with another player and a winner and a loser are then decided. Moreover, the main game device 10 is designed to output image signals and audio signals as a result of the game processing. The monitor 12 is configured so as to provide the player with images and sounds corresponding to the image signals and audio signals from the main game device 10.

The game server system 2 comprises a game server 20 and a storage area 21.

The game server 20 comprises configurations as a general-purpose high-performance computer device by including, for example, a CPU, a memory, a hard disk, and a communication device. The game server 20 runs programs compatible with the game processing method of this invention to operate as a game server system that controls the communication game system. Namely, it controls the client system 1 which is connected to the access point of a game network 40. The storage area 21 is the game server 20 itself or the area accessible by the game server 20 and is the area capable of storing as files the databases required to operate the communication game system.

The line network 4 is a normal public or private line to form a WAN such as the game network 40 and the Internet 41.

The game network 40 is a network provided to operate the communication game system. For example, it is a dedicated network composed of the game server system 2 and each client system 1 by connecting the client systems 1 to particular access points controlled by the game system 2. However, it does not have to be such a PPP connection, but it may have the connection configuration via the Internet where the client systems access the game server from any connection point. There is no restriction on protocols to be used, but general-purpose protocols such as TCP/IP may be used in consideration of the cases where the client systems 1 use WWW features of the Internet, and where the client systems 1 are designed to achieve general versatility.

The Internet 41 is a WAN to which any number of computer devices can connect, where file browsing, e-mail, and file transfer can be performed by using various kinds of commands defined by TCP/IP protocols. In particular, it uses the WWW feature of the Internet in this embodiment.

The WWW server system 3 comprises a WWW server 30 and an HTML (hyper-text format) storage area 31.

The WWW server 30 has configurations as a general-purpose high-performance computer and is given a network address on the Internet 41, and is configured to enable browsing hypertext files stored in the HTML storage area 31 by specifying the particular network address from a computer connected to the Internet 41. The HTML storage area 31 is a storage area controlled by the WWW server 30 and stores in a given directory the HTML files created by the WWW server 30 or transferred by the game server system 2 in order to display the results of the communication game. The purpose of this WWW server is to inform battle histories, but the server does not have to be the Internet server, and a dedicated server may be provided to which the files recording the battle histories can be uploaded and the client systems can connect and browse.

Figure 2:
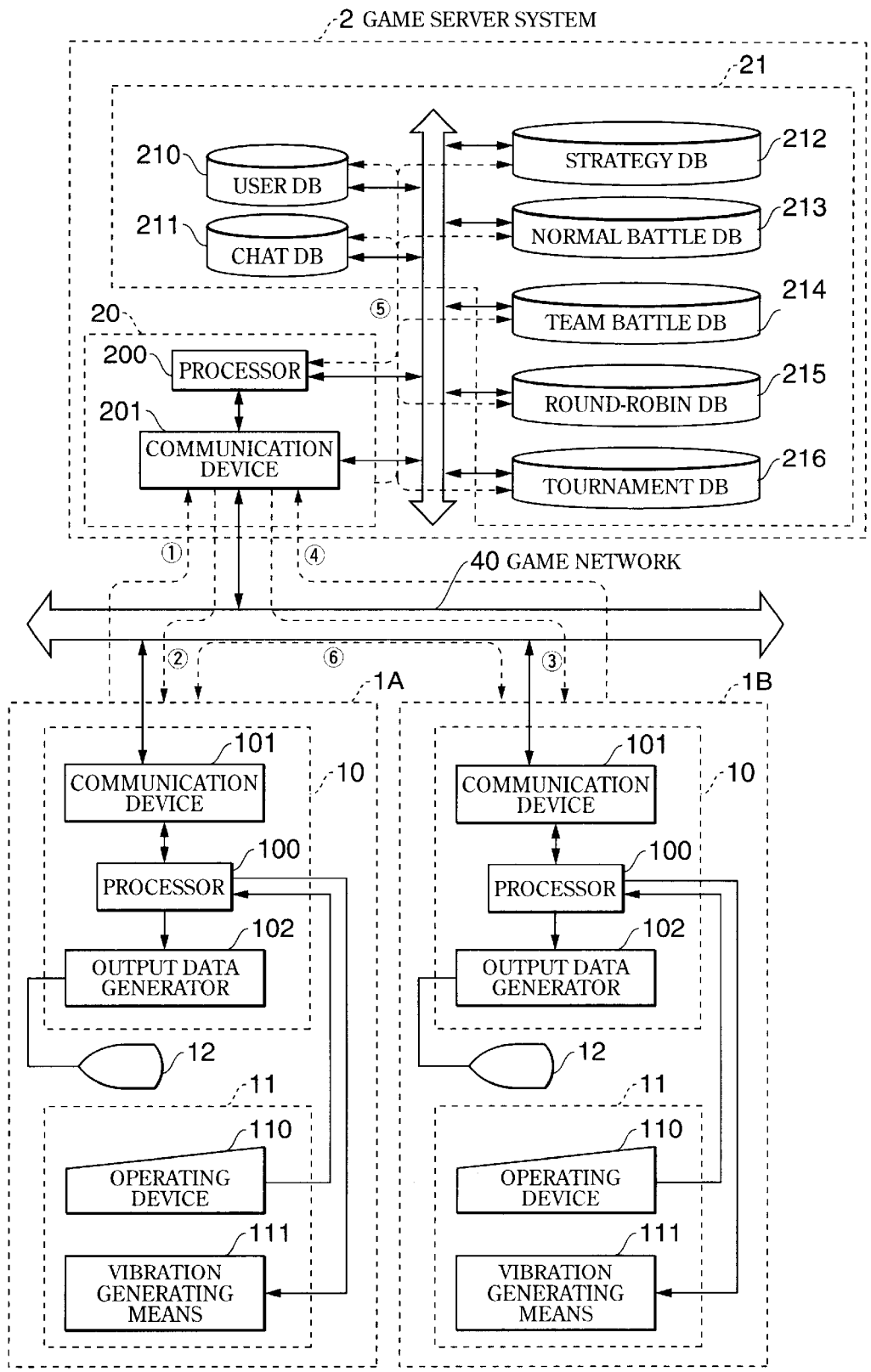
FIG. 2 is a hardware block diagram of the communication game system of this invention.

FIG. 2 is a detailed feature block diagram of this communication game system. In each of the client systems 1 (A and B), a processor 100 and a communication device 101 belong to the main game device 10. An output data generator 102 and a control pad 11 belong to the control pad 11.

The processor 100 is a computing part which has a CPU as its central part and runs game programs. The processor 100 recognizes the operating signals from an operating device 110, outputs vibration signals to a vibration generating means 111, controls communications conducted by the communication device 101, and controls the output data generator 102. The communication device 101 is, for example, a modem or a terminal adapter and intermediates data transmissions between the game network 40 or the Internet 41 and the processor 100. The operating device 110 comprises the operating functions necessary to operate a game, such as operation buttons and a cross key. The vibration generating means 111 can make the player who is operating the control pad 11 perceive the vibrations corresponding to the vibration signals of a given frequency by means of, for example, inverse piezoelectric effects of piezoelectric elements.

In the game server system 2, a processor 200 and a communication device 201 belong to the game server 20. The storage area 21 stores a user database (hereinafter abbreviated as "DB") 21, an easy lobby DB 211, an expert lobby DB 212, a normal DB 213, a team battle DB 214, a round-robin DB 215, and a tournament DB 216.

The user DB 210 stores personal information of a player who is allowed to use the communication game system, such as a unique control number of each main game device 10, the player's address and contact as well as the player's personal battle history, winning average, registered comments, ranks, and character information.

The easy lobby DB 211 stores index information of an easy lobby, i.e., an easy battle mode. For example, battle combinations, dates and times, and chat information in the easy lobby are recorded.

The expert DB 212 stores index information of an expert lobby, i.e., an expert battle mode. For example, the name of each battle group (strategy name), the number of participants, a battle type, link information to DB 213 through DB 216, and chart information in the expert lobby.

In the normal DB 213, the team battle DB 214, the round-robin DB 215, and the tournament DB 216, battle group information of each battle type is recorded. For example, the following information is recorded: the name of the battle group (strategy name), the number of participants, the number of battles, starting and finishing times of each strategy, member names (with ID's), ranks of each member, game rules, information of the determined combinations, battle histories, and chart information of the battle groups.

These databases can be cross-referenced and their relationships are set up so that all information can be read by key data.

The processor 200 is a computer part which controls the communication game system, and performs the battle control of the client system determined by the program by referring to each of the databases 210 through 216 and by controlling the communication device 201. In particular, this embodiment uses the databases 210 through 212 common to the respective embodiments described later and the normal database 213. The communication device 201 controls the access points on the game network 40 and intermediates data transmissions between each client system 1 and the communication system 200.

Actions of the Client System

The actions of this embodiment are hereinafter described. The basic action of individual client systems 1 is first explained with reference to FIG. 8.

Each client system 1 uses distinctively an independent mode where the game processing proceeds based on the operating signals generated by the program and the player, and a communication mode where the game processing mainly proceeds based on commands provided through communications.

In either operating mode, the main game device 10 interprets the operating signals from the control pad 11 and moves characters (operable segments or models) on the game screen. The above-mentioned two modes are different in that in the independent mode, the movements of a competitor's character in the game are determined by the program, while in the communication mode such movements are determined by commands sent from the client system 1 which has become a battle competitor via the game network 40. In the communication mode, the main game device 10 changes the operating signals into commands and sends them out to the game network 40.

Figure 8:
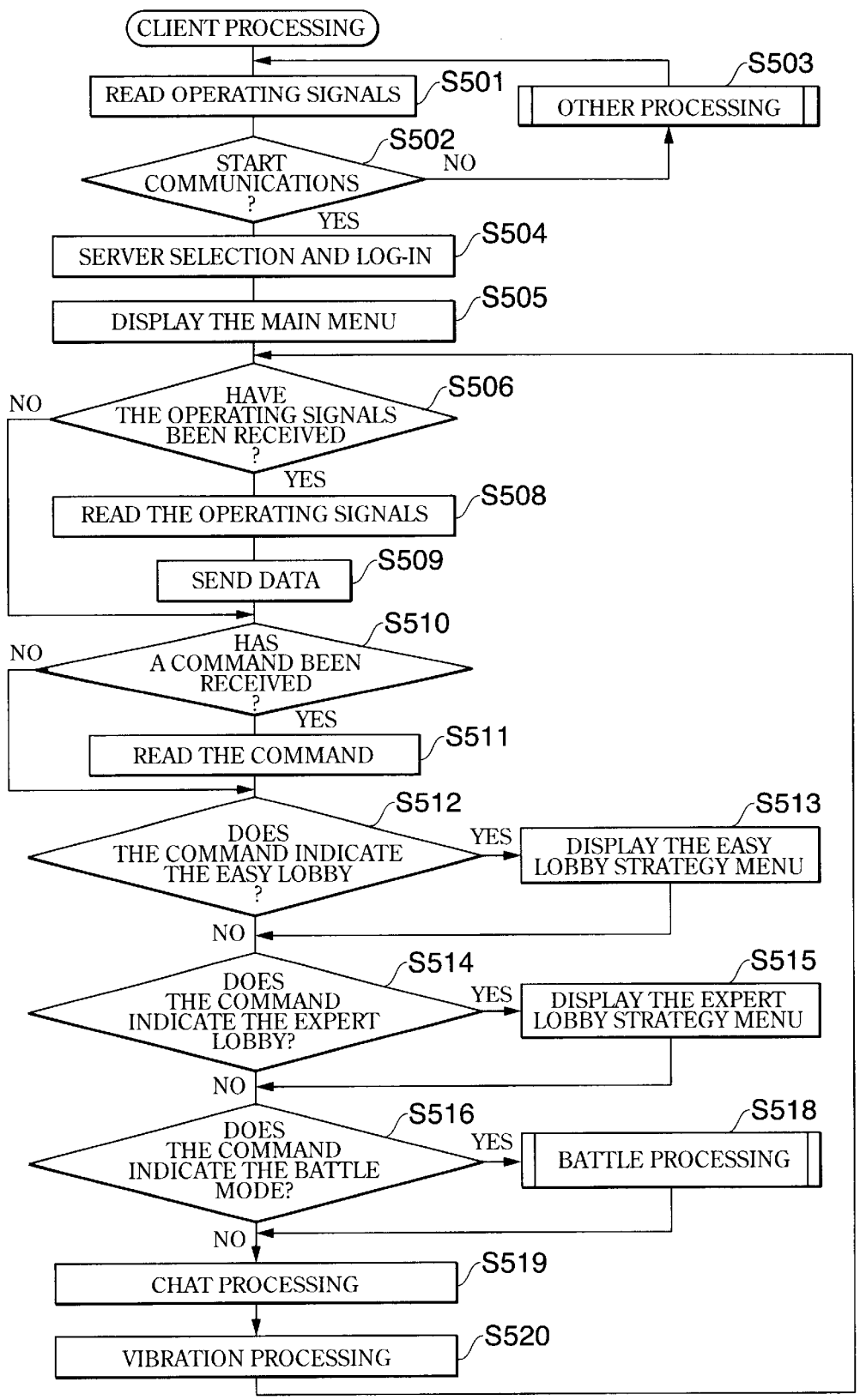
FIG. 8 is a processing flow chart of a client system of this invention.

Specifically, as shown in FIG. 8, the main game device 10 reads operating signals (S501) and verifies whether the details of the operation indicate the start of communications (S502). If it is not the start of communications (S502:NO), it is in the independent mode and the processing then proceeds as the normal game device (S503).

On the other hand, if the operating signals indicate the start of communications (S502:YES), the main game device 10 performs general procedures to establish connections to be in the communication mode. That is, the main game device 10 selects and calls a pre-registered server, and after the connection, the main game device 10 sends necessary information such as a handle name, ID, and password (S504). If it fails to be connected, the processor handles it as a normal error, displays an error message, and returns to the original state.

After the connection is established, the main game device 10 displays the main menu (S505). When the start of the game is indicated by the player, the main game device 10 then performs a permanent loop processing not to return to the original state unless any special operation such as an escape is performed. In other words, if the operating signals are provided (S506:YES), the main game device 10 reads the operating signals (S508) and changes them into a command according to predetermined command rules and sends it to the game network 40 (S509). If the command is sent from the game network 40 (S510:YES), the main game device 10 reads the command (S511) and proceeds to an interpretation routine.

Namely, if the command indicates the display of an easy lobby strategy window (S512:YES), the main game device displays a basic screen (see FIG. 9) of the easy lobby strategy window (S513). In the same way, if the command indicates the display of an expert lobby strategy window (S514: YES), the main game device 10 displays a basic screen of the expert lobby strategy window (S513). The expert lobby strategy window includes various window displays (FIGS. 11 through 26) in addition to the basic screen (see FIG. 10 etc.). These basic screens are displayed based on the image data saved in the client system. However, the game server system 2 may be configured in such a manner that it stores hypertext files for displaying these strategy windows, provides the client system with these files as necessary, and displays them according to the browser functions for browsing hypertexts.

If the command indicates the transition to the battle mode (S516:YES), the main game device 10 uses image data in the client system instead of these image displays to perform the battle processing (S518).

If the client system 1 is allocated to the battle mode, the main game device 10 moves its own character according to the operating signals and changes the position and status of a competitor's character according to the operational commands provided by the game network 40. The allocation of the operational commands can be determined arbitrarily for each game. These processings enable game battles as if a player is battling with another player by connecting two control pads 11 to one game device.

If the client system 1 is allocated to the game watching mode, the main game device 10 moves both characters and changes their display status on the basis of the operational commands provided by the game network 40. This processing enables players to watch the game in the same manner as friends who cheer on those friends who are playing a game at an amusement arcade.

If chat information is sent as a command, the main game device 10 displays character strings on the screen of the monitor 12 based on the chat information (S519). If a command for vibrations is sent, the main game device causes the vibration generating means 111 of the control pad 11 to vibrate.

The procedures by which a player challenges another player the battle in the easy battle mode (easy lobby) are hereinafter described with reference to FIG. 2. These procedures for the easy battle mode are almost the same for the expert battle mode (expert lobby), which will be described later.

Figure 9:
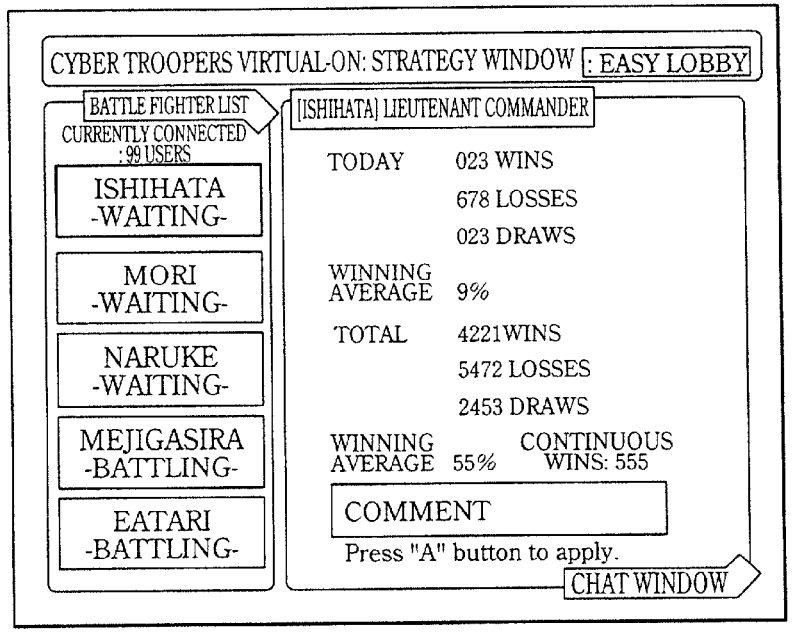
FIG. 9 is a sample display of an easy lobby strategy window (S01).

As shown in FIG. 2, with the client systems 1A and 1B being connected, the game server 20 monitors the client systems 1 that are being connected at that time and stores the ID's of those client systems and the number of connected users in the easy lobby DB 211. The game server displays the easy lobby strategy window as shown in FIG. 9 at the client system entering the easy battle mode. In this window, a battle fighter list shows the names of the connected users, their status, and the total number of the connected users based on the connected user data that the game server 20 has sent by searching the easy lobby DB 212.

If the cursor is on the battle fighter list on the basis of the operating signals, the client system 1A sends selection information of this cursor to the game server 20 (via route ①). The game server 20 reads the battle history of this player from the user DB 211 (via route ⑤) and returns it to the client system 1A (via route ②). The client system 1A displays it as battle fighter information. When the player of the client system 1A operates the control pad 11 to apply for a battle (①), the game server 20 sends the application to the client system 1B (via route ③). In response to it, the player of the client system 1B answers whether or not he accepts the battle (via route ④).

When the answer shows the rejection of the application, the game server 20 sends the rejection to the client system 1A (①). The player of the client system 1A searches for another client system and applies for a battle again.

On the other hand, if the answer from the client system 1B shows an acceptance of the application, the game server 20 sends the acceptance to the client system 1A (①) and sends both client systems a command to proceed to the battle mode (① and ③). The client systems 1A and 1B proceed to the battle mode and then send each other commands by their own operations (via route ⑥). The game server system 2 intermediates the sending and receiving of commands in the battle mode, but such a configuration may be adopted that the commands are sent and received by directly specifying the network address of the other party. Almost the same communication procedures are used for the expert battle mode (expert lobby).

Overall Actions

The sequences of individual client systems and the game server system have been described above, but this invention is characterized by its overall battle management positioned on top of these individual sequences. This is described mainly by referring to the status transition diagram of FIG. 3. This figure shows the status of individual client systems 1 which changes under the management of the game server system 2. This figure is common to the embodiments described later.

In this invention, when any of the client systems request a battle, the game server system 2 is designed to select and perform either the easy battle mode (easy lobby) in which any one of the client systems is selected to battle or the expert battle mode (expert lobby) in which the client system 1 belongs to any of the battle groups and fights battles in each battle group.

In the easy battle mode, as described above, the game server 20 displays the main menu on the client systems 1 with which communication has been established (S00), and when the easy lobby is selected, the game server 20 displays the easy lobby strategy menu which is the basic screen for the easy battle (S01:FIG. 9). When the battle is accepted, the game server 20 causes the fighting client systems 1 to be in the battle mode (S02).

The client system 1 displays the start menu when a start button is pressed on the control pad 11 (S03). When the expert lobby is selected from this start menu or the main menu, the game server 20 displays the expert lobby strategy window which is the basic screen for the expert battle (S10).

Since the expert lobby requires more playing experience, it is preferable that the client system 1 be configured so as to start with the easy lobby when it is connected for the first time. After that, the player should be able to select either battle mode freely.

Figure 10:
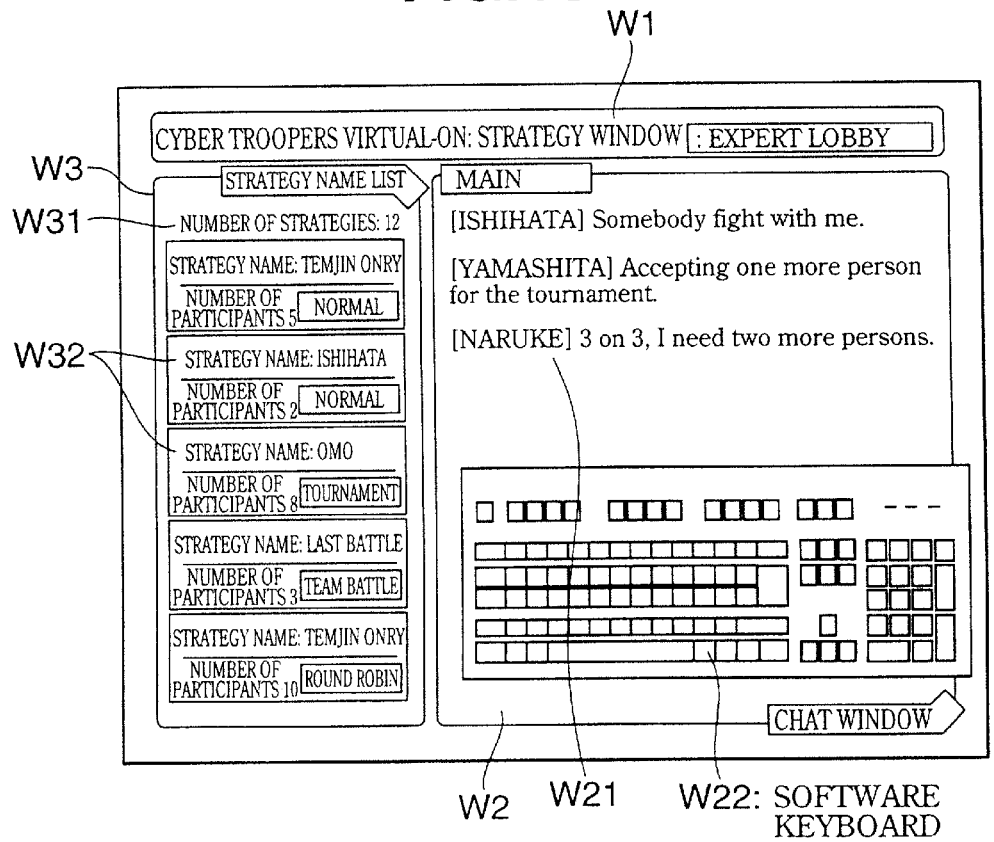
FIG. 10 is a sample display of an expert lobby strategy window (S10).

As shown in FIG. 10, as the expert lobby strategy menu, a title window W1, a chat window W2, and a strategy name list W3 are displayed. The title window W1 is a display field of the battle mode. The chat window W2 displays character strings W21 chronologically which are based on the chat information that has been sent from the client systems 1 entering the expert battle mode. When the chat information is sent, the game server 20 stores the chat information in the expert lobby DB 212 together with the name of the sender and displays the chat window W2 based on such chat information. The chat window W2 displays a pseudo keyboard W22 for entering character strings. The strategy name list W3 is a list of battle groups displayed by the game server 20 with reference to the group information stored in the expert lobby DB 212. This strategy name list W3 is a list of the battle group units, unlike the list of connected users that are shown by client system in the easy lobby strategy window (FIG. 9). Specifically, a plurality of battle groups, each of which consists of the strategy name, the number of participants, and the battle mode, are displayed. It is preferable that whether the groups are in battle or not can be shown in the list by using a lamp display or the like.

Figure 11:
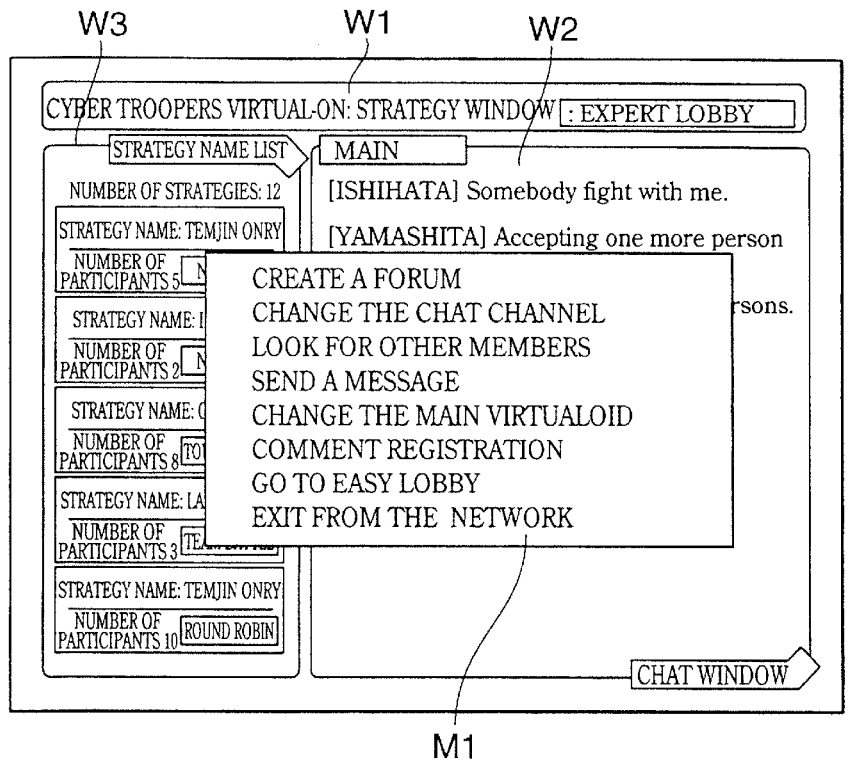
FIG. 11 is a sample display of a start menu (S11).

When the player operates the start button of the control pad 11, the client system 1 is designed to display the start menu M1 corresponding to the mode at that time (S11: FIG. 11).

Figure 12:
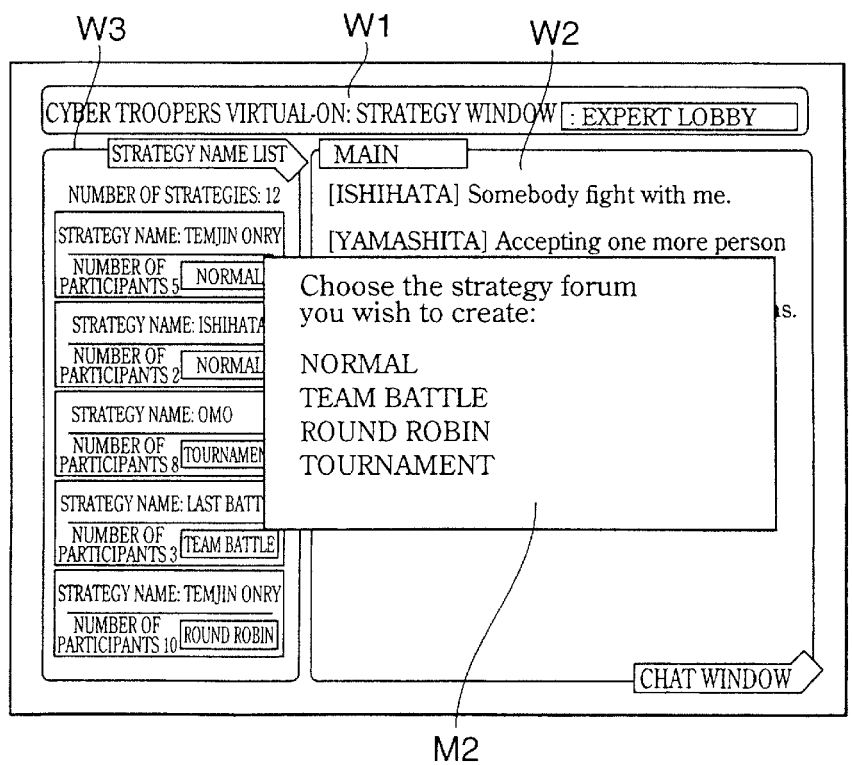
FIG. 12 is a sample display of a forum selection menu (S12).

When "create a forum" is selected in the start menu M1, the game server 20 further displays a menu M2 from which a battle mode is selected (S12:FIG. 12). When any one of the battle modes is selected from this menu, a new battle group is formed corresponding to the battle mode and its "strategy forum" is displayed (S13).

When more than one client system 1 participate in the "strategy forum" formed in the selected battle mode after new registration (S30, S40, S50, S60), one battle group is formed. The strategy forum or the battle group is formed as described in this Embodiment if "normal" is selected in the menu M2. The strategy forum or the battle group is formed as described in Embodiment 2 if "team battle" is selected. The strategy forum or the battle group is formed as described in Embodiment 3 if "round-robin" is selected. The strategy forum or the battle group is formed as described in Embodiment 4 if "tournament" is selected.

In the forum creating processing (S13), the client system 1 which requests a new registration can determine arbitrary game rules. Only this client system which has newly registered can change the game rules of this strategy forum and starts battles of the battle group. The client system which has newly registered and started the "strategy forum" is hereinafter called a "host". The group information for recording the necessary information such as the game rules related to this battle mode and the participating members is registered in the corresponding databases 212 through 216 by the game server 20. Each time a new participating member registers or changes the game rules, the game server 20 changes and updates the group information.

Figure 13:
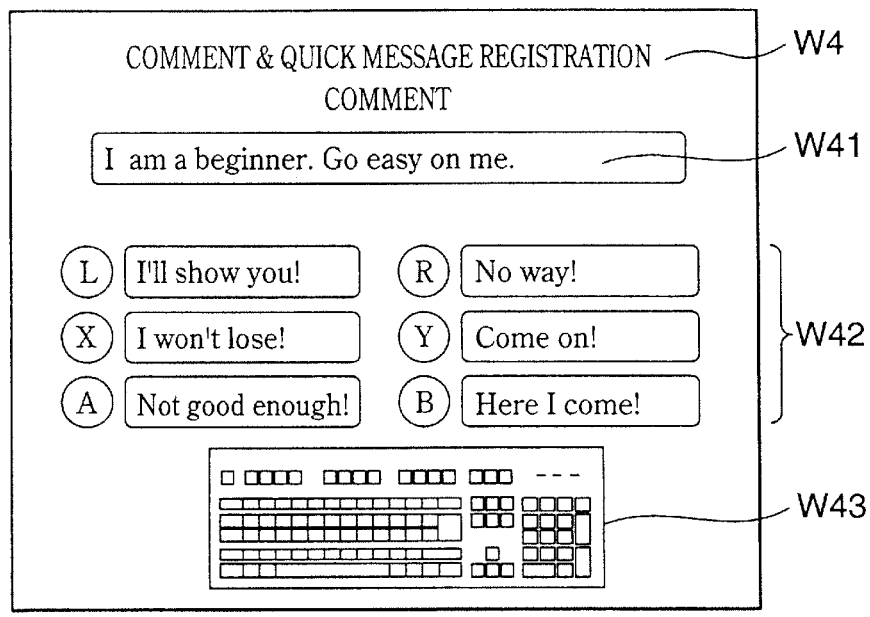
FIG. 13 is a sample display of a comment registration (S14).

When "comment registration" is selected from the start menu M1, the game server 20 displays a comment registration window W4 (S14: FIG. 13). This window W4 includes: a comment field W41 where a player enters self-introduction sentences which he wants to be displayed when his personal information is referred to by other client systems 1; a quick message field W42 where the player registers according to operation buttons of the control pad 11 the letters that he wants to provide the other client systems in the same battle group watching the battle in the battle mode; and a software keyboard W43 for entering character strings. When the player enters any letters in these fields, the game server 20 stores them in the user DB 210 corresponding to the operation buttons. The character string information for displaying these comments are transferred to each client system 1 by the game 20 in advance. The database stores associating information which associates each comment with the operational commands. The game server 20 watches for operational commands on the game network 40 and when it receives operational commands, it reads the associating information from the database and sends it to each client system 1. Each client system 1 displays the character string information corresponding to the associating information on the screen.

When "change the chat channel" is selected in the start menu M1, the game server 20 changes the chat channel from a common chat channel for the expert battle mode to the battle group's own chat channel. Specifically, the server 20 switches the database for reading the chat information between the chart DB 211 and other databases 213 through 216.

When "send a message" is selected from the start menu M1, the game server 20 stores in the database the chat information provided by the client system in the selected chat channel and supplies the chat information to the other client systems 1 that are being connected.

When "look for other members" is selected from the start menu M1, the game server 20 displays the battle groups that were not displayed in the strategy name list W3. When "change the main Virtualoid" is selected from the menu, the game server 20 makes it possible to change the characters adapted to each client system 1 and updates the user DB 210 with the changed contents. When "go to the easy lobby" is selected, the game server 20 causes the client system 1 to proceed to the status S01. When "exit from the network" is selected, the game serer 20 sends the client system 1 a command to proceed from the communication mode to the independent mode and the client system 1 then exits from the game network.

Figure 14:
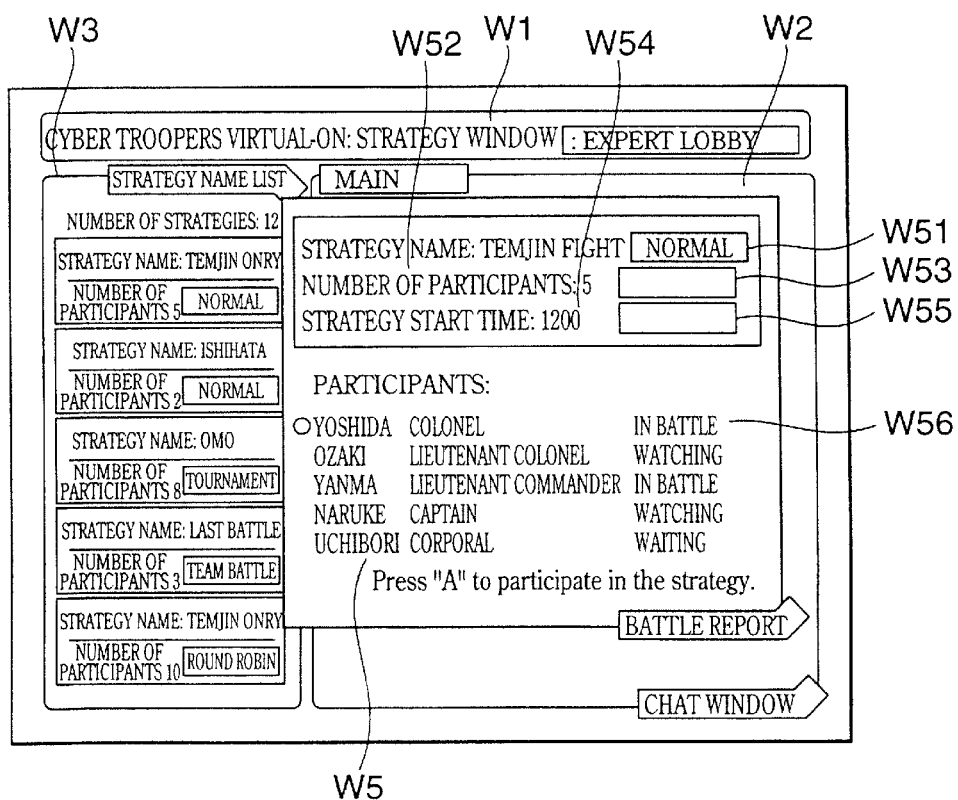
FIG. 14 is a sample display of a battle situation reporting window (S20).
Figure 15:
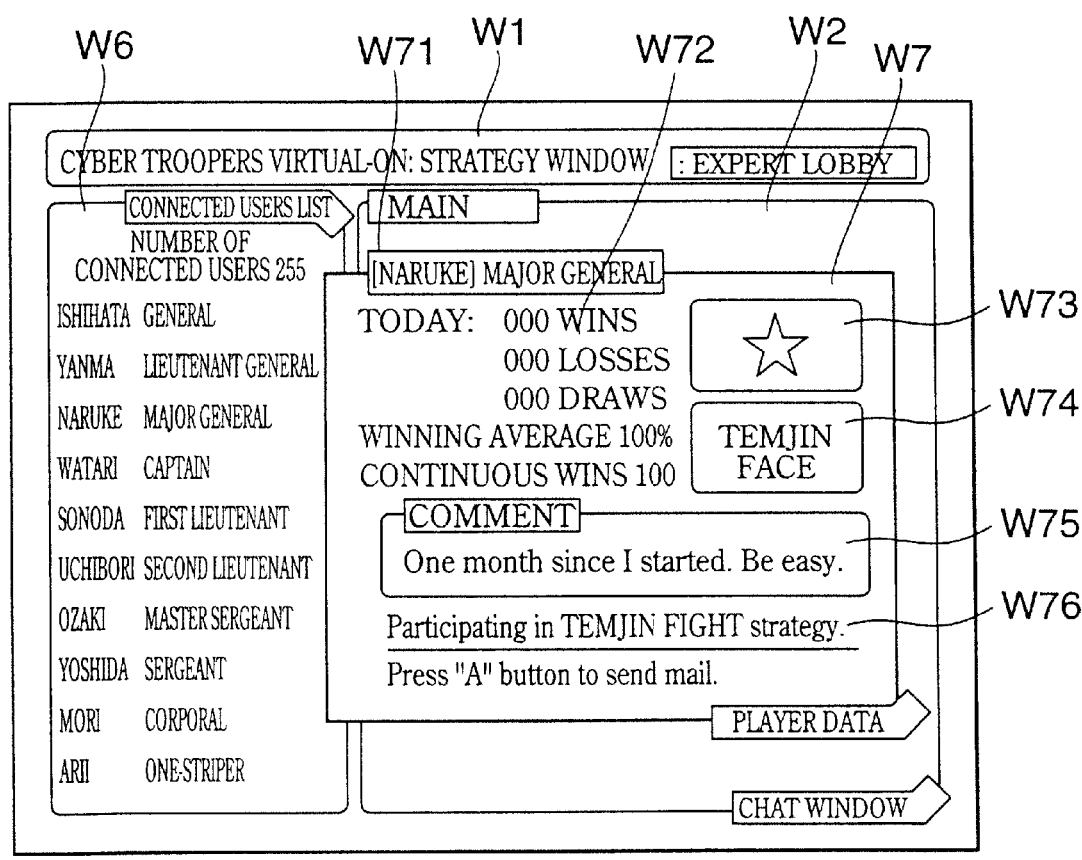
FIG. 15 is a sample display of a list of connected players (S21).

In the expert lobby strategy window (S20: FIG. 10), when the player places the cursor on the strategy name list W3, the strategy name information selected by the cursor is supplied as a command to the game server 20. The game server 20 searches the expert lobby DB 212 based on this strategy name information, specifies the databases 213 through 216 which store the relevant battle group, and then reads its detailed information and returns it to the client system 1. Accordingly, a battle situation window W5 is displayed (S20: FIG. 14).

The window W5 displays a battle mode W51, the number of participants in the battle group W52, a battle type display of either an actual battle or a simulation battle W53, a strategy start time at which this battle group was formed W54, the status W55 which specifies the game rules, and participating members W56.

Each player has its rank determined and registered depending on the battle history stored in the user DB 210. The rank is assigned to the members. Participating members may be displayed according to the order of the ranks, because it can motivate the players to level up to higher ranks. On the contrary, some players feel that such a way of playing the game is hard-hearted if the ranks always affect the battles. For those player who feel this way, the player who has newly set up a battle group can select at his option either the "actual battle" in which the ranks are applied or the "simulation battle" in which the ranks are not considered.

The game server 20 monitors the connection status of each participating member and displays the status next to each member name. For example, the status of "in battle" is displayed for players in battle, the status of "watching" is displayed for players watching the battle, and the status of "waiting" is displayed for players browsing the expert lobby strategy window.

If the player performs given operations while the strategy situation reporting window W5 is being displayed, the game server 20 reads personal information on all the client systems 1 being connected regardless of the battle groups from the user DB 210 and displays a list of connected users W6. It also displays the total number of connected users (S21:FIG. 15). If any one of the connected users is selected by a cursor in a list of connected users, the game server 20 further reads the personal information of the client system 1 corresponding to the connected user from the user DB and displays it in a player data window W7. The window W7 displays the name of the connected user W71, the score of the day W72, a rank mark corresponding to the rank W73, the display of the character being adopted by the client system 1 to be used in the battle game W74, comments W75 registered in S14, and the present status W76 of the client system 1. When a given operation (for example, pressing an L button or an R button) is performed in this condition, the total score of the client system 1 is displayed based on the user DB 210. Also, when another operation (for example, pressing an A button) is performed, a message is sent to the client system 1 that has been selected.

If the player performs a given operation (for example, pressing the A button) in the battle situation reporting window W5 (S20: FIG. 14), the client system 1 that has conducted this operation is registered as having newly participated in this battle group. Namely, the game server 20 determines that the client system 1 has requested to participate in the selected battle group and registers this client system 1 with this battle group as a new participant (S30). The game server 20 newly associates the personal information of the client system 1 that requested the participation with the group information of the battle group.

For new entries (S30), authorization processing may be conducted in such a way that a password is set up for each battle group and participants cannot participate in the battle group without entering the password. In other words, when there is a new request to participate in the battle group, the game server 20 requires the client system 1 wishing to participate to enter the password and allows it to participate in the battle group only when the correct password is entered.

Normal Strategy Forum

The battle management of the battle group for which "normal" has been set up as the battle mode is described below. The "normal" battle mode is a battle performed according to such game rules that when a battle is over, the winner, loser, both fixed client systems, or either one of the fixed client systems continues to fight a battle with another client system.

Figure 16:
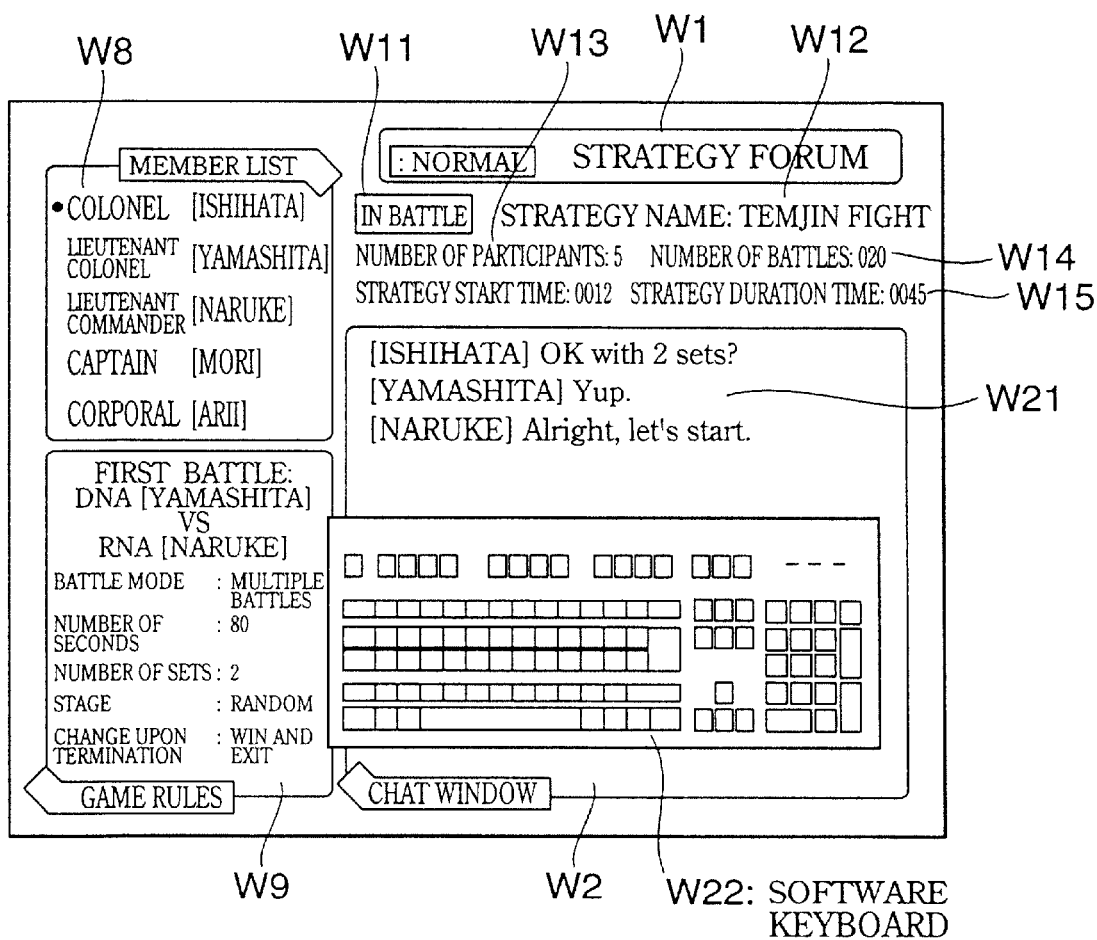
FIG. 16 is a sample display of a normal strategy forum (S30).

FIG. 16 shows an example of a screen display supplied to the client systems 1 participating in the "normal" battle mode. This "strategy forum", i.e., the lobby strategy window for a specific battle group, is provided to only the player (host) who started the battle group or the players who participate in the battle group afterwards. The game server 20 makes each display by reading the corresponding record from the normal DB 213.

In the title window W1, "normal" is displayed, which is the mode for this battle mode. Under such title, the status window W11 indicating whether it is in battle or not, the strategy name W12 which is the name of this battle group, the number of participants W13, the number of battles W14 fought by this battle group in the past, and strategy continuation time W15, which includes the strategy start time when the battle group started and the elapsed time are displayed. The chart window W2 displays the character strings W21 based on the chat information and the software keyboard W22. In this window, only the members participating in this battle group can read and write chat information.

A member list W8 displays a list of members with their ranks. Whether each client system 1 is in battle, watching the game, or referring to the lobby is indicated in different colors. At the beginning of the name of the player who created this battle group, an icon is attached which indicates that he is the host.

A game rule window W9 displays the game rules that the host determined in S13. The "first battle" displays the names of the players who are scheduled to fight a battle first. The "battle type" displays whether it is the actual battle mode in which the ranks are considered or the simulation battle mode in which the ranks are not considered. When the actual battle mode is set, the number of seconds, the number of sets, and the stage are set to fixed values and the battle results are reflected on the change of the ranks. The "number of seconds" shows the length of time allocated to one battle. The "number of sets" shows the number of set matches per battle. The "stage" shows the game stage used for the battle. The "change upon termination" shows the rules of how to determine the next combination when a battle is over.

Depending on the settings of "change upon termination", the order of the battles changes greatly, thereby making it possible to show the uniqueness of this battle group. If this is set to "fixed", battles are repeated between the clients that are determined as the first combination. If this is set at "DNA fixed", the client systems on the RNA side change regardless of the battle results. If this is set to "RNA fixed", the client systems on the DNA side change regardless of the battle results. If this is set to "win and exit", the client system which has won the battle is replaced by another client system. If this is set to "lose and exit", the client system which has lost the battle is replaced by another client system. It is designed to set up the "lose and exit" as default.

Figure 17:
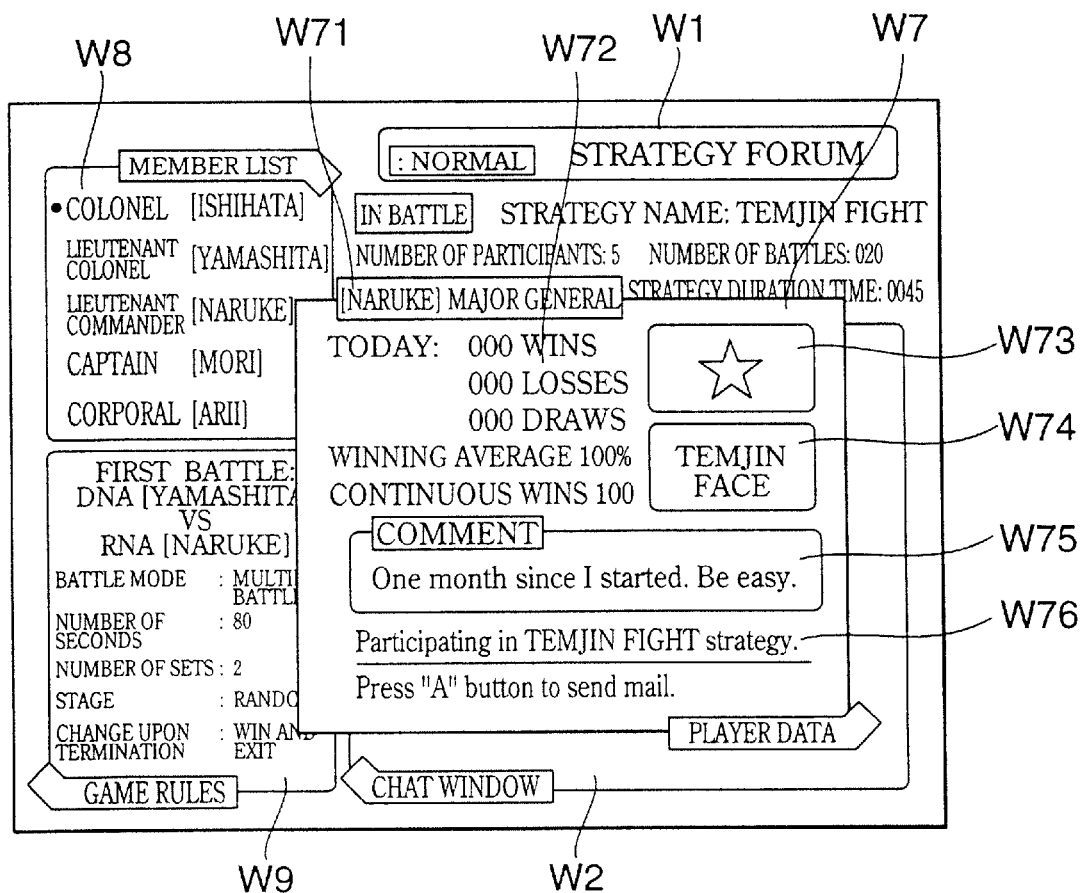
FIG. 17 is a sample display of a player data window (S33).
Figure 18:
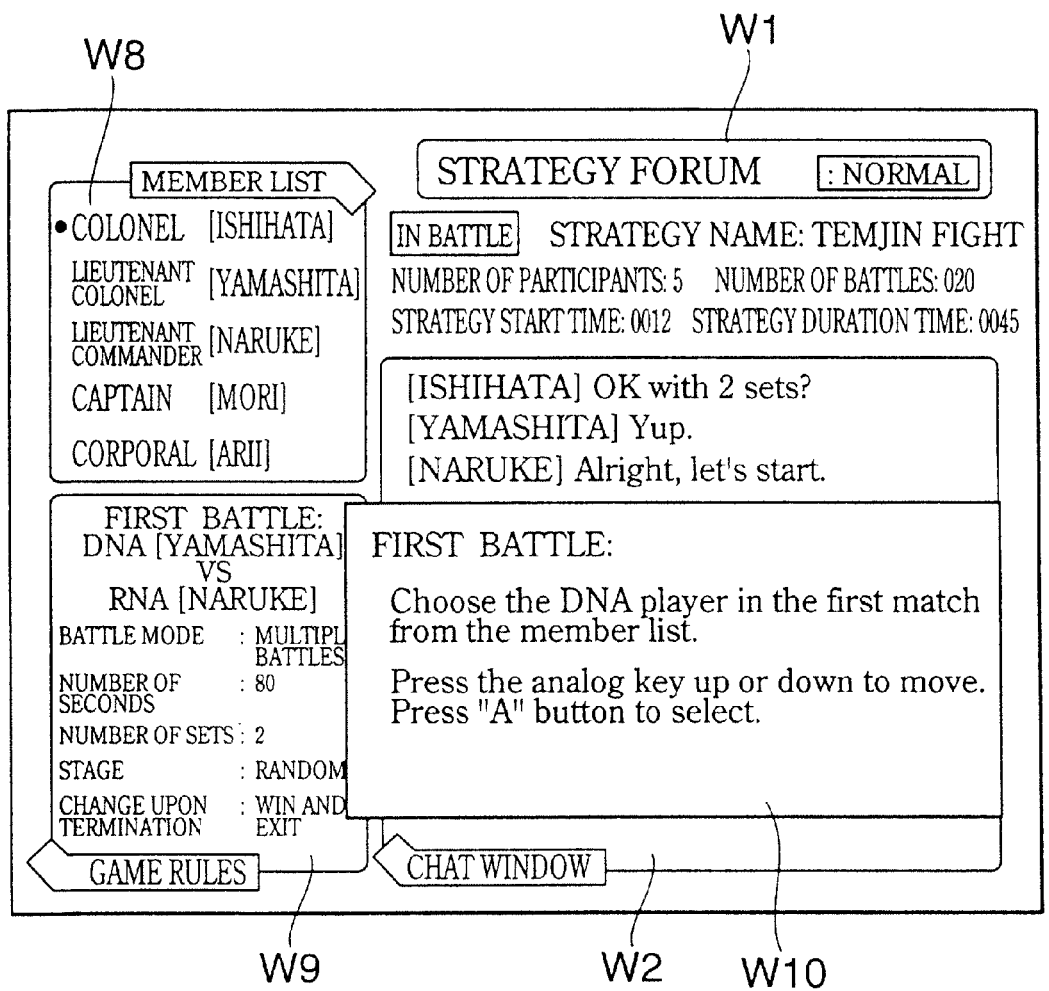
FIG. 18 is a sample display of a game rule change window (S32).

In status S30, when the player moves the cursor to any one of the members that are being displayed in the member list W8, the game server 20 reads the personal information corresponding to the member from the user DB and displays it in a player data window W7 (S33: FIG. 17). This window is the same as the player data window in FIG. 15.

In status S30, only when the player of the host client system 1 presses the start button of the control pad 11, the start menu similar to that as shown in FIG. 11 is displayed. However, it is different in that the start menu M1 has the additional items of "start the game" and "change the game rules".

Only the host client system 1 is authorized to change the game rules. If the host player selects "change the game rules", the game serer 20 proceeds to the game rule change status (S32) and displays a game rule change window W10, as shown in FIG. 17, at the host client system 1. The change window of "first battle DNA" is shown as an example in FIG. 17 here. If the player operates the control pad 11 according to the messages, the game server 20 changes the combination of the "first battle" according to the operation and updates the normal DB 213. The fighting members are changed to those who are selected by the player from the member list W8 with the cursor. The battle form, the number of seconds, the number of sets, the number of stages, respective numerical values at the change upon termination, and the rules are also decided by selection.

If the player of the host client system 1 selects "Start the game" from the start menu, the game server 20 causes each client system 1 to proceed to the battle mode (S34).

Figure 4:
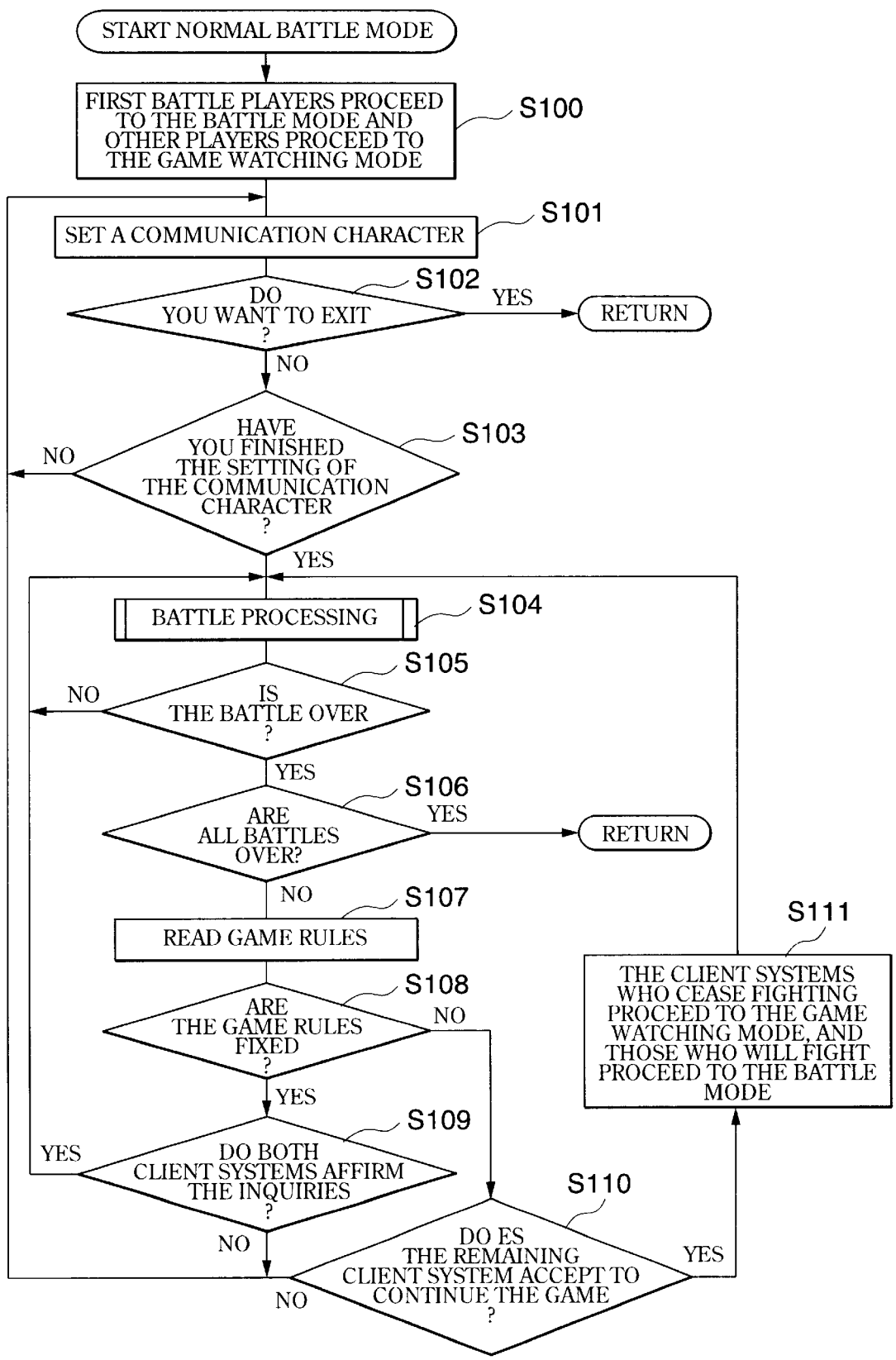
FIG. 4 is a flow chart of a communication game processing method (normal battle mode) according to Embodiment 1.

Detailed actions in the normal battle mode are described based on FIG. 4.

The game server 20 sends a command to proceed to the battle mode to the client systems 1 that are set up as the combination of the "first battle," and a command to proceed to the game watching mode to the other client systems 1 (S100).

Subsequently, the game server 20 causes the client systems entering the battle mode to designate characters to be displayed in the battle. The characters are selected, for example, from a plurality of candidates. If the player specifies the predetermined key operations such as an escape key at the time of setting up the communication character (S201:YES), it is possible to exit from the permanent loop and to return to the expert lobby.

If the setting of the communication characters is over (S103:YES), the game server sends a command to start a battle to the client systems 1 that are set up as the first combination (S104).

At the client systems 1 entering the battle mode according to this command, the main game body 10 displays game battle images, move its own character according to the operational signals from the control pad 11, and sends the data (operational command) for the battle to the game network 40. If the operational commands of a competitor's character is sent from the game network 40, the processing is conducted to move the competitor's characters according to the operational commands. The game server 20 intermediates the sending and receiving of such operational commands.

At the client systems 1 entering the game watching mode, game images similar to the client systems 1 entering the battle mode are displayed based on the operational commands sent from the client systems 1 entering the battle mode. However, at the client systems 1 in the game watching mode, although the characters fighting the battle are displayed on the game screen, their movements are not affected by the operations of the control pad 11 by the players. The battle processing continues until the battle by the combination is over (S105:NO).

During the battle, the game server 20 refers to the user DB 210, reads message information assigned to the operations indicated by the operational commands registered in the status S14, and sends it to each client system 1. Also, during the battle, when chat information entered by the operation of the software keyboard is sent from one of the client systems 1 in the game watching mode, the game server 20 sends this chat information to each client system 1. Each client system 1 displays character strings of quick messages or chats registered at the given positions on the battle game screen displayed on each client system (FIG. 8: S519).

If the operational command sent by either of the client systems 1 is a particular command to defeat the competitor's character, the game server 20 sends each client system 1 a command to generate vibrations. When each client system 1 receives this command to generate vibrations, the vibration causing means 111 is caused to generate vibrations (FIG. 8: S520). This allows the operating players and the members watching the game to feel the excitement as if they were in a real battle.

When the battle is over (S105: YES), unless all the battles are over (S106: NO), the game server 20 reads the information of the game rules from the normal DB 213 (S107).

If the game rules (to be changed upon termination) is set to "fixed" (S108: YES), battles are repeated with the same members. The game server 20 makes inquiries to the client systems 1 by asking questions like "Do you want to fight battles with the same settings?" Only when both client systems 1 affirm such inquiries (S109: YES), battles with the same combination are repeated (S104 through S108). If at least either one of them does not affirm the inquiries (S109: NO), the processing proceeds to the setting of the communication characters (S101). If the player conducts a particular key operation, the game server 20 causes the client system 1 to return to the strategy forum (status S30).

If the game rule is set to the condition other than "fixed" (S107: NO), as long as the client systems 1 which are expected to remain according the game rules affirm the inquiries about the continuation of the game from the game server 20 (S110: YES), the battle procedure with the new combinations are repeated (S104 through S110). The game server 20 causes the client systems 1 to get out of the game to proceed to the game watching mode and causes the next client systems 1 to proceed to the battle mode (S111).

For example, if the game rules are set forth as "DNA fixed", the game server 20 causes the client system on the RNA side to proceed to the game watching mode and causes any one of the client systems in the game watching mode to proceed to the battle mode. If the game rules are set forth as "RNA fixed", the game server 20 causes the client systems on the DNA side to proceed to the game watching mode and causes any one of the client systems in the game watching mode to proceed to the battle mode. If the game rules are set as "win and exit", the game server 20 causes the winning client system to proceed to the game watching mode and causes any one of the client systems in the game watching mode to proceed to the battle mode. If the game rules are set as "lose and exit", the game server 20 causes the losing client system to proceed to the game watching mode and causes any one of the client systems in the game watching mode to proceed to the battle mode. It is designed to set the rule of "lose and exit" as a default.

If the client system 1 to remain refuses to continue battling (S110: NO), the game server 20 causes the respective client systems 1 to proceed to the strategy forum (S30). Moreover, if the client system 1 to be the next competitor returns to the strategy forum when setting the communication character, the game server 20 causes the following client system 1 to proceed to the battle mode.

If the battle of the last combination is over (S105: YES), all the battles are over (S106: YES), and the game server 20 then causes all the client systems 1 to return to the strategy forum (status S30).

At that time, the game server 20 judges the ranks. In other words, if the battle type is set as the "actual battle", the game server 20 judges the ranks of the battle group members based on the battle results. For example, the judgement is conducted by raising, by one rank, the rank of the client system 1 which has reached the predetermined number of games won and by lowering, by one rank, the rank of the client system 1 which has reached the predetermined number of games lost. If there is a client system that has not connected to the game network for a certain period of time, its rank is lowered by one rank. The game server 20 updates the battle history information in the personal information of the client system 1 of which rank has been changed.

When any change of rank takes place, the game server 20 displays a window in the strategy forum in the display form of an "official announcement" to the effect that there has been a change of the rank. Moreover, if any change of rank takes place, the game server 20 creates a file for displaying the battle history based on the battle history information of the user DB 210 and transfers it to the storage area of the WWW server system. In other words, the game server 20 creates a hypertext file for displaying the battle history, connects to the Internet, and then transfers the file to the HTML storage area 31 of the WWW server 30 by utilizing an ftp command or the like. This allows the battle history to be stored in the state readable by a computer. Regarding the file for displaying the battle history, it is preferable that the setting be made to periodically cause the game server 20 to create the file by searching the user DB 210 and to transfer the file.

Embodiment 1 has the following advantages:

(1) Since this embodiment enables the selection of either the simple easy lobby or the expert lobby for expert users, it is possible to provide appropriate game environments for both beginners and expert players.

(2) Since this embodiment is designed so that the game starts with the easy lobby, it is possible to prevent players without enough knowledge from entering the expert lobby and becoming confused or from bothering other players.

(3) Since this embodiment is designed to allow the selection of a necessary menu at the start menu, the operation is simple and easy to become familiar with.

(4) Since this embodiment is designed to set up self-introduction comments for each player and to display them on the other player's system, the other player can easily become aware of the competitor's character, etc.

(5) Since this embodiment is configured in such a way that quick messages such as hoys to be displayed upon operations are displayed on the other systems in response to the operation buttons, it is possible to have more realistic communications with others without placing a burden on the players during operations.

(6) Since this embodiment is configured in such a way that the battle group can be set up in the form of a forum with any given rules, it is possible to provide the players with a wide variety of player-dominated ways to play games and a multiplicity of options.

(7) Since this embodiment displays the state of the battle group as the menus, other players can easily comprehend the present state of the battle group.

(8) Since this embodiment is designed to display the battle history of each player together with the number of winning games and a winning average, it is possible to easily understand the strength of each member.

(9) Since this embodiment enables the players to chat freely, it is possible to deepen the communications between the players.

(10) Since in this embodiment a plurality of chat channels are provided at a plurality of levels, it is possible to enjoy a wide variety of chatting from general chatting to chatting among specified persons.

(11) Since this embodiment enables the players other than those who are fighting within the battle group to watch the game, it is possible to provide an entertaining game environment just like in a situation where friends are playing and watching battle games at amusement arcades.

(12) Since this embodiment enables the game watching players to send chatting messages to the fighting players, it is possible to provide an entertaining game environment just like in a situation where friends are watching battle games at amusement arcades.

(13) Since this embodiment can make new battle combinations in various forms, it is possible to set up an entertaining way to make the game advance in a style appropriate for users.

(14) Since this embodiment can send messages to any connected users without limiting to only the battle group where they belong, it is possible to provide an entertaining communication environment.

Embodiment 2

Embodiment 2 of this invention relates to a communication game system for performing a team battle within the battle group.

The system configuration, hardware configuration, overall processing procedures, and the actions of each client system are similar to those of FIGS. 1 through 3 and FIG. 8 of Embodiment 1and their descriptions and, therefore, the descriptions of such configurations and the like of Embodiment 2 are omitted.

The "team battle" of this embodiment means a battle mode in which one group is divided into two subgroups to compete with each other for a victory. The client systems selected from both the subgroups fight a battle, and the losing client system as a result of the battle is replaced by another client system in the same subgroup to battle with the winning client system.

Figure 3:
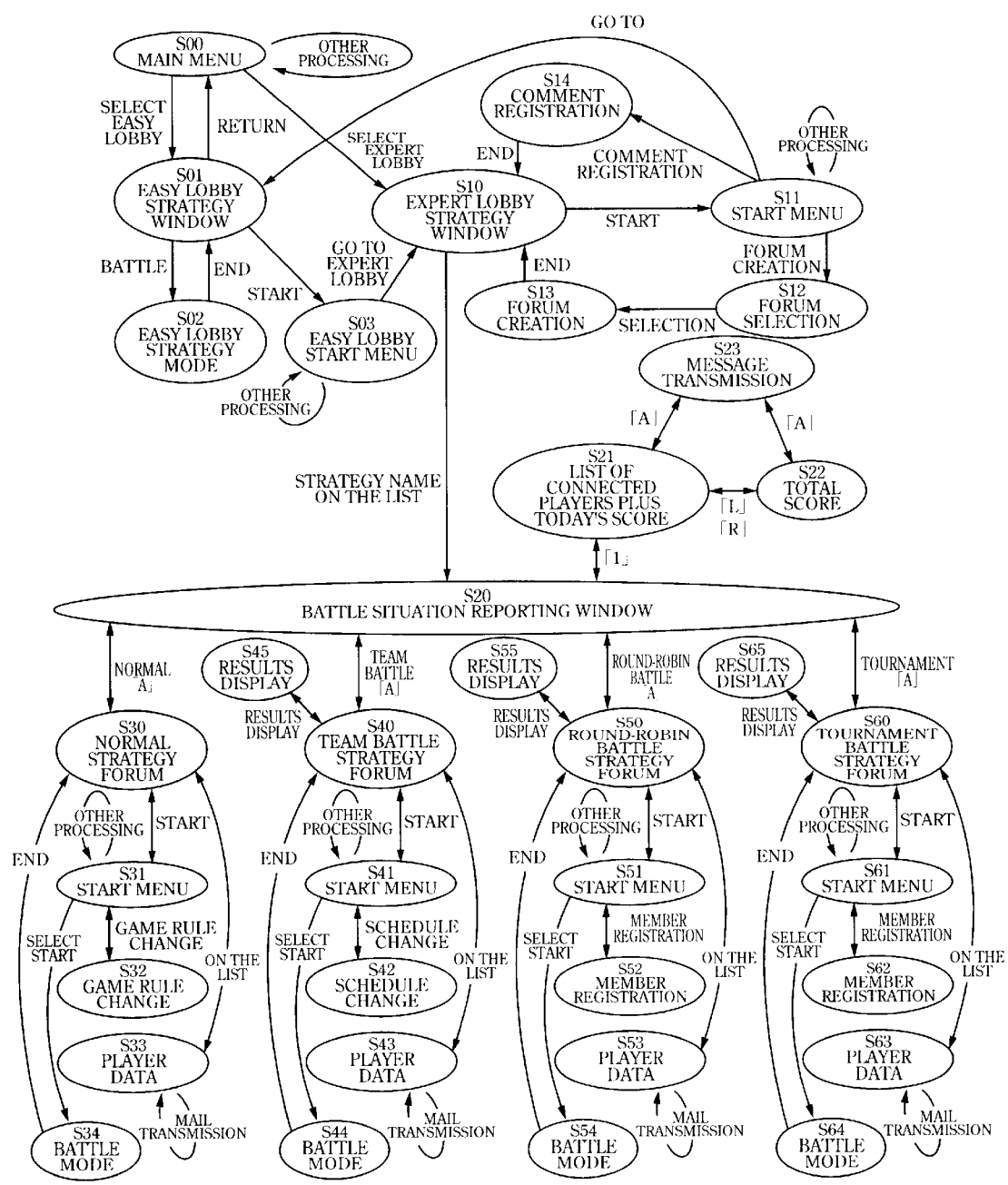
FIG. 3 is a state transition diagram of the communication game system of this invention.

A "team battle strategy forum" (team battle group) is created when the host client system 1 selects the "team battle" from the menu M2 of the status S12 of FIG. 3 (FIG. 12). The client system 1 which creates the "team battle strategy forum" determines the battle form, the number of seconds, the number of sets, the number of stages upon the creation of the forum at the status S13, in the same manner as in Embodiment 1. In particular, the client system 1 which creates this forum divides the battle group into two subgroups of DNA and RNA as shown in FIG. 19 and needs to create a battle schedule in which the order of the battles in each subgroup is determined.

A player of the client system 1 who wishes to participate in the "team battle" puts the cursor on the icon of the strategy forum in the battle names list W3 where the battle mode is indicated as the "team battle" in the expert lobby strategy menu (FIG. 10). The game server 20 searches the expert lobby DB 212 based on the information of this battle name, specifies the team battle DB 214 in which the battle groups of the "team battle" are stored, reads the detailed information, and returns it to the client system 1.

In the battle situation reporting window W5 (status S20), when the player performs a given operation (such as pressing the A button), the game server 20 judges that the client system 1 has requested to participate in the selected battle group and registers the client system 1 as a new participant with this battle group (S40). In other words, the team battle DB 214 is updated by associating the personal information of the client system 1, which requested the participation, with the group information of the battle group.

Figure 19:
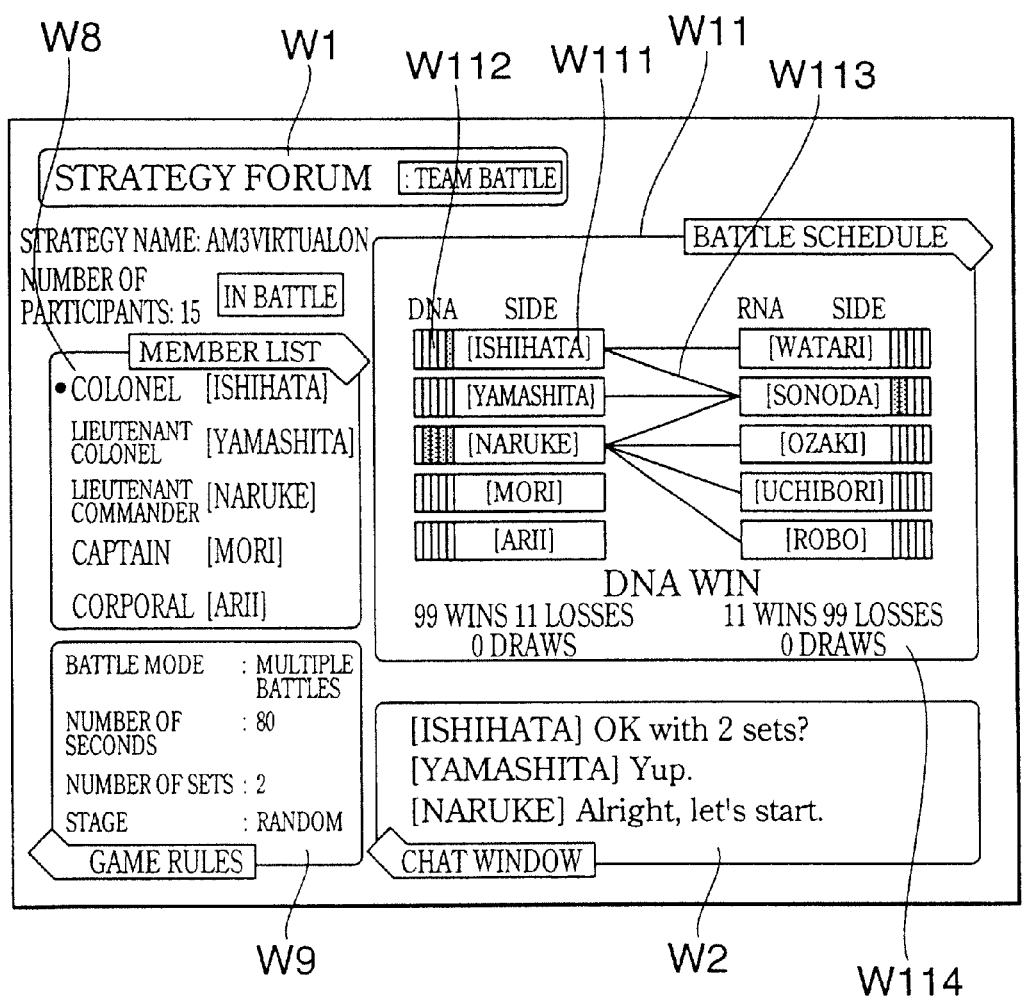
FIG. 19 is a sample display of a team battle strategy forum window (S40).

FIG. 19 shows a sample screen display which is supplied to the client systems 1 participating in the "team battle" mode. This "strategy forum" is supplied only to the client system (host) which created the battle group or those who participate in it. The game server 20 makes each display by reading the corresponding record from the team battle DB 214.

The battle mode "team battle" is shown in the title window W1. Under this title, the status display showing whether it is in battle or not, the strategy name which is the battle group name, and the number of participants are displayed. The chat window W2, the member list W8, and the game rule window W9 are similar to those in FIG. 16. However, in the game rule window W9, the game rules are set up to replace the losing client system 1 with another member of the subgroup to which the losing client system 1 belongs and, therefore, there is no setting of "change upon termination". A battle schedule window W11 displays in a name field W111 the members of the two subgroups DNA and RNA in the order of the battles. A display field of the number of winning games W112 shows the number of winning games for each member of the team battle. A combination display W113 shows the combinations of battles. A results display W114 shows the number of winning games, losing games, and ties for each subteam.

Figure 20:
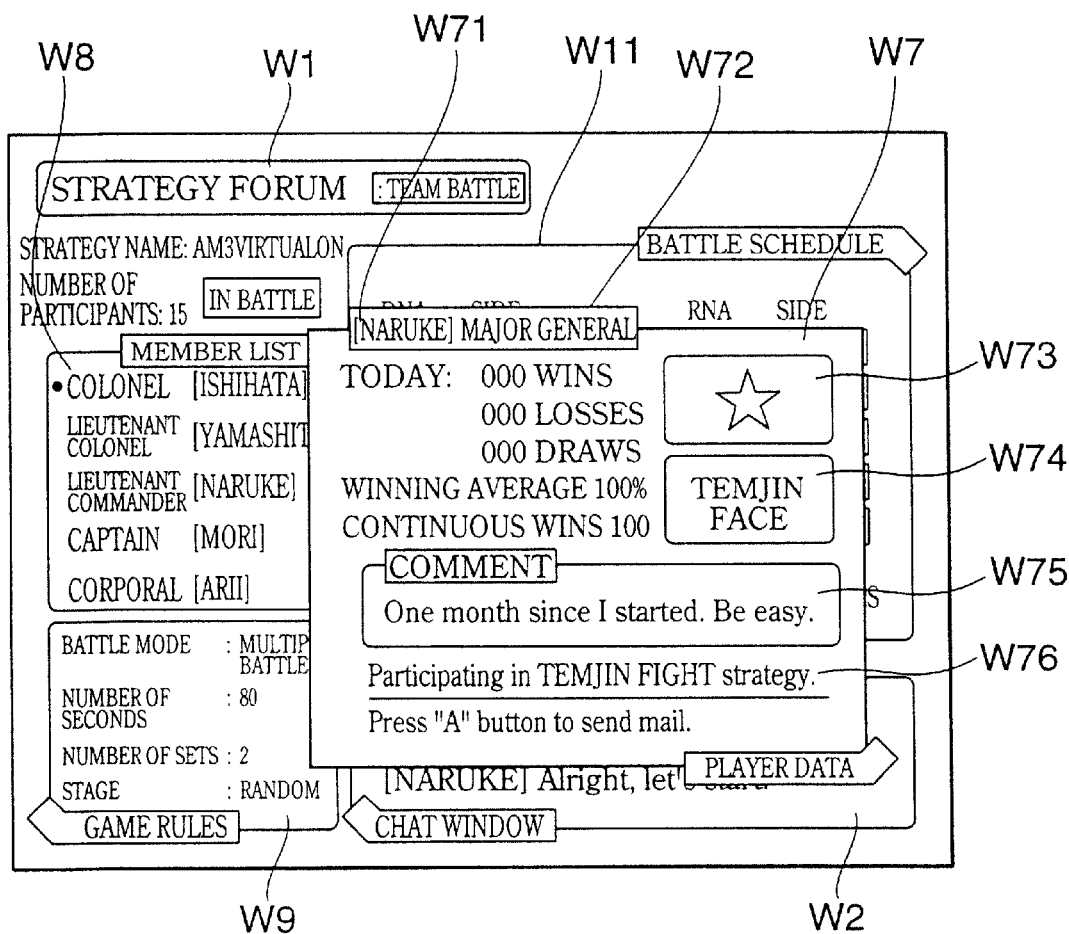
FIG. 20 is a sample display of a player data window (S43).

In status S40, when the player puts the cursor on any one of the members displayed in the member list W8, the game server 20 reads the personal information corresponding to the member from the user DB and displays it in the player data window W7 (S43: FIG. 20). This window is the same as the player data window in FIG. 15. In status 40, only when the player of the host client system 1 presses the start button of the control pad 11, the start menu similar to that as shown in FIG. 11 is displayed (S41). However, it is different in that the start menu M1 has the additional items of "start the game" and "change the team battle schedule".

Figure 21:
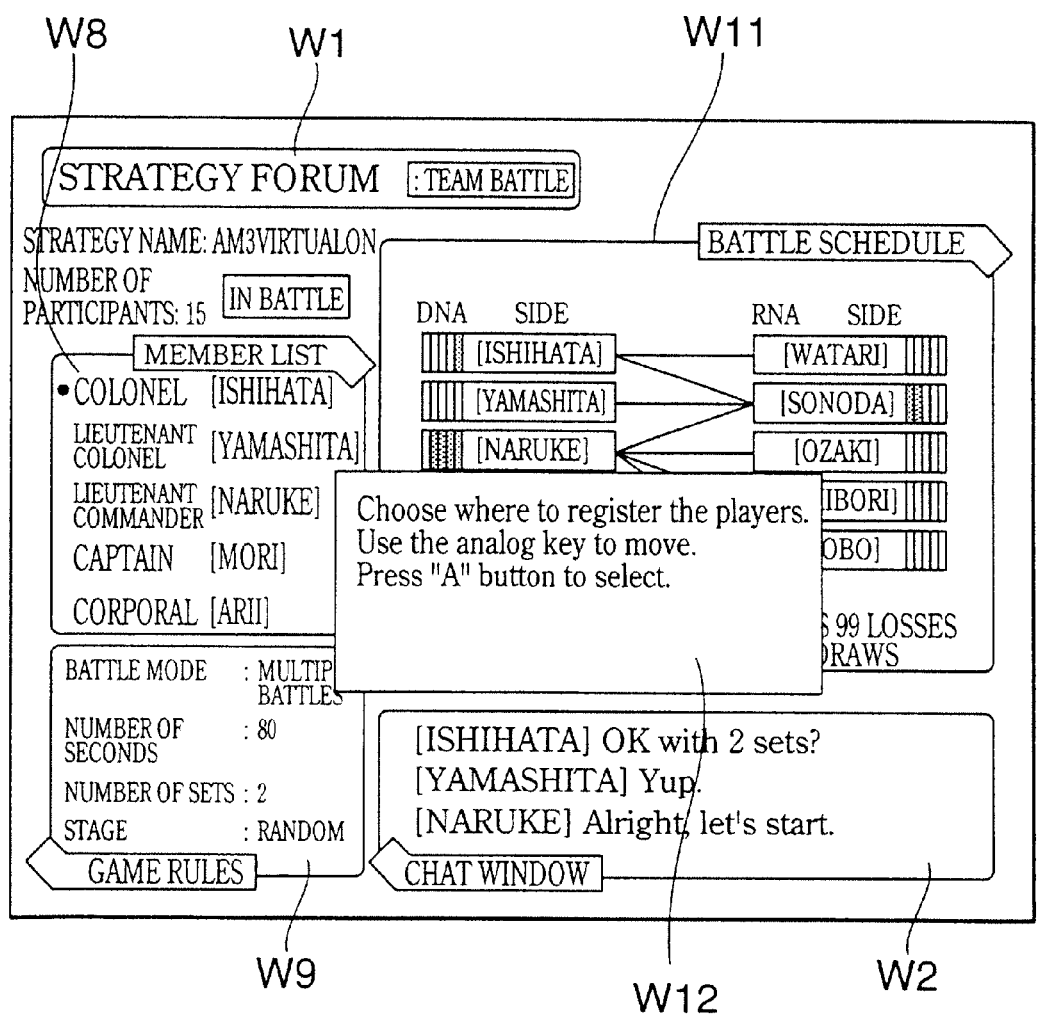
FIG. 21 is a sample display of a battle schedule change window (S43).
Figure 22:
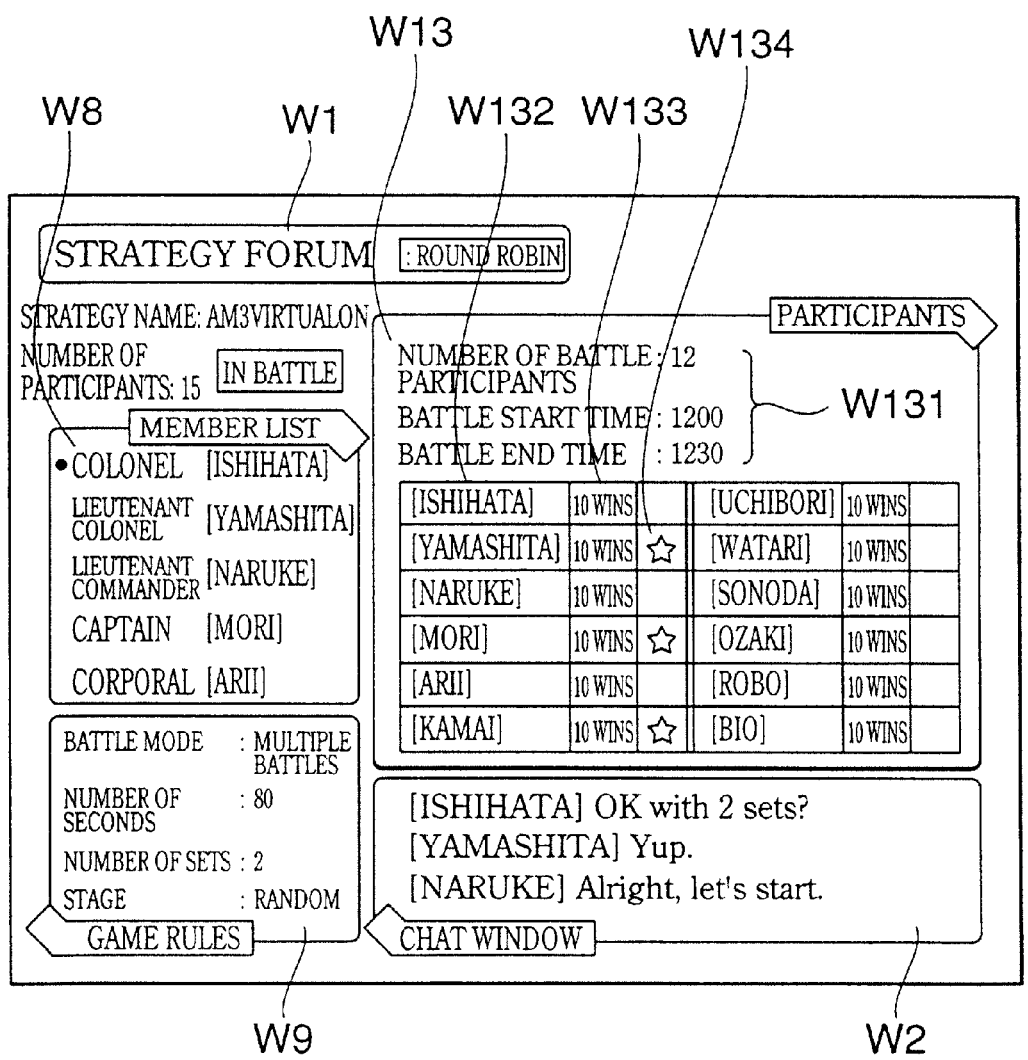
FIG. 22 is a sample display of a round-robin battle strategy forum (S50).

Only the host client system 1 is authorized to change the game rules. When the player of the host selects "change the team battle schedule", the game server 20 proceeds to the schedule change status (S42) and displays a team battle schedule change window W12 as shown in FIG. 21 on the host client system 1. In this window, the host client system 1 can change the registration of the members selected from the member list W8 in arbitrary order in any of the subgroups. The battle form, the number of seconds, the number of sets, the number of stages and the rules are also decided by selection.

If the player of the host client system 1 selects "start the game" in the start menu, the game server 20 causes each client system 1 to proceed to the battle mode (S44).

Figure 5:
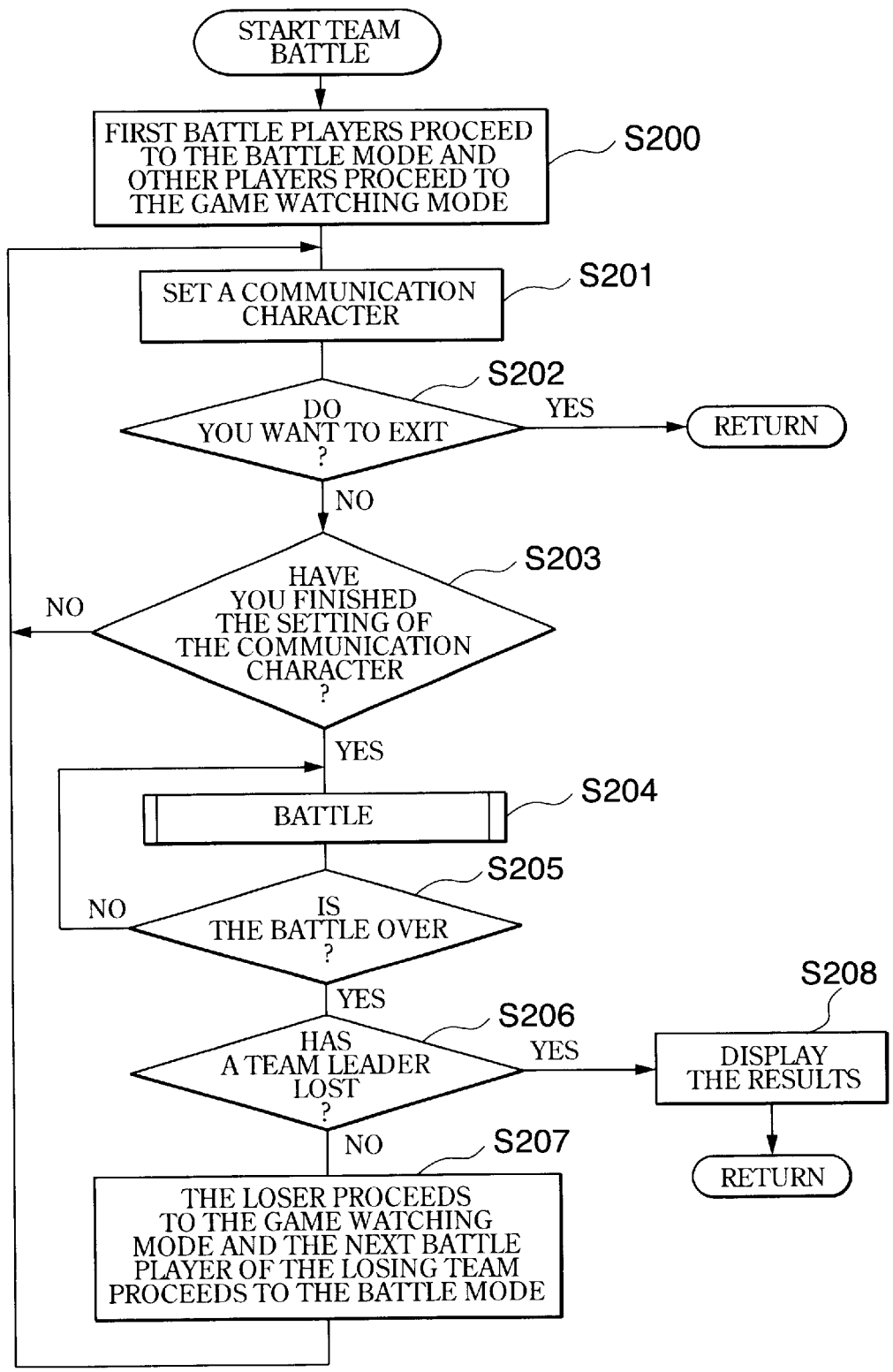
FIG. 5 is a flow chart of a communication game processing method (team battle mode) according to Embodiment 2.

Detailed actions in the team battle mode are hereinafter described based on FIG. 5.

The game server 20 sends a command to cause the client systems 1 which are set as the first combination in the battle schedule to proceed to the battle mode, while it sends a command to the other client systems 1 to proceed to the game watching mode (S200). If some client systems 1 participate in the forum later, the game server 20 causes such client systems to participate in the team battle in the game watching mode.

The game server 20 causes the client systems 1 entering the battle mode to designate characters to be displayed in the battle (S201). The characters are selected, for example, from a plurality of candidates. If the player specifies a particular key operation such as the escape key at the time of the setting of the communication character (S202: YES), it is possible to exit from the permanent loop and to return to the expert lobby.

When the setting of the communication characters is over (S203: YES), the game server sends a command to start the battle to the client system 1 which is set up as the first combination (S204). The actions of the respective client systems 1 in the battle mode and the game watching mode, and of the game server 20 are similar to those in Embodiment 1.

Until the battle of the first combination is over (S205: NO), the battle processing continues. When the battle is over (S205: YES), unless the player whose rank is a "team leader" in any of the subgroup has lost (S206: NO), the team battle continues. In other words, the game server 20 causes the client system that has lost to proceed to the game watching mode, and causes a client system ordered in a second position in the subgroup of the losing client system to proceed to the battle mode (S207), and draws a line of the combination display W113 between the name of the new client system and the name of the winning client system. Moreover, the game server 20 increases the number of markers in the display of the number of winning games W112 of the winning client system. Subsequently, the process to set the communication characters and the following process (S201 through S207) are repeated.

If the "team leader" of either subgroup (S206: YES) loses, the game server 20 reports the results of the team battle to each client system 1 (S208). The game server 20 updates the score display W114 of the subgroups according the battle results.

In the same way as in Embodiment 1, the game server 20 judges the ranks around the time when the battle results are displayed. The battle histories are uploaded to the WWW server in the same way as in Embodiment 1.

Accordingly, Embodiment 2 has the effects similar to those of Embodiment 1. Also, since Embodiment 2 is configured to enable team battles, it is possible to provide such a unique way of playing the game that remote players form a team to battle.

Embodiment 3

Embodiment 3 of this invention relates to a communication system for performing a round-robin battle in the battle group. The system configuration, hardware configuration, overall processing procedures, and the actions of each client system are similar to those of FIGS. 1 through 3 and FIG. 8 of Embodiment 1 and their descriptions and, therefore, descriptions of such configurations and the like of Embodiment 3 are omitted.

The "round-robin battle" of this embodiment is a battle mode in which a client system battles with all the other client system in the same battle group. When a battle of one combination is over, the next battle combination is decided by selecting, for each client system, any of the other client systems against whom the former client system has not yet fought, and which is not fighting in a battle.

A "round-robin battle forum" (round-robin battle group) is created when the host client system 1 selects the "round-robin" in the menu M2 of the status S12 of FIG. 3 (FIG. 12). The client system 1 that creates the "round-robin battle forum" determines the battle form, the number of seconds, the number of sets, and the number of stages upon the creation of the forum of the status S13 in the same manner as in Embodiment 1. Particularly in this forum, since the game server 20 causes a plurality of combinations of the client systems 1 to battle simultaneously, the host client system 1 registers the members participating in the round-robin battle with the list of the participating members from the battle group.

The player of the client system 1 who wishes to participate in the "round-robin battle" puts the cursor on the icon of the strategy forum in the strategy name list W3, which indicates the "round-robin battle" as the battle mode in the expert lobby strategy menu (FIG. 10). The game server 20 searches the expert lobby DB 212 based on the strategy name information, specifies the round-robin battle DB 215 which stores the corresponding battle group of the "round-robin battle," reads its detailed information, and returns it to the client system 1. In the battle situation reporting window W5 (status S20), when the player performs a particular operation (for example pressing the A button), the game server 20 judges that the client system 1 has requested to participate in the battle group being selected and registers the client system 1 as a new participant with the battle group (S50). In other words, the round-robin battle DB 215 is updated by associating the personal information of the client system 1, which requested to participate in the battle, with the group information of the battle group.

Figure 23:
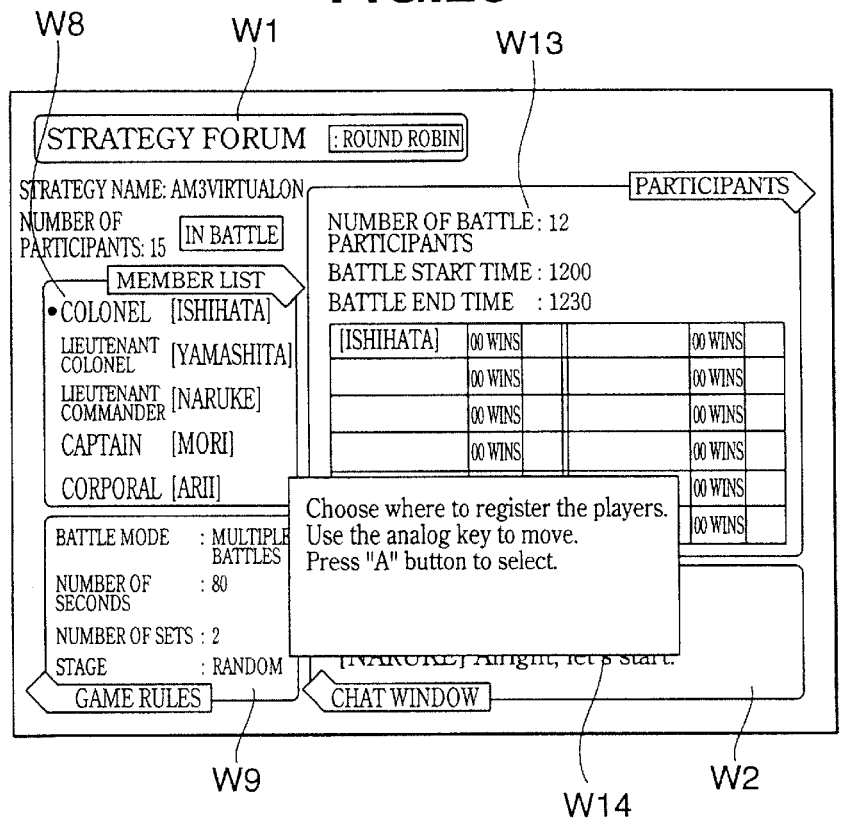
FIG. 23 is a sample display of a participating members registration window (S52).

FIG. 23 shows a sample screen display which is supplied to the client systems 1 participating in the "round-robin battle" battle mode. This "strategy forum" is supplied only to the client system (host) which created the battle group or those who participate in it. The game server 20 makes each display by reading the corresponding record from the round-robin battle DB 215.

The battle mode "round-robin battle" is shown in the title window W1. Under this title, the status display showing whether it is in battle or not, the strategy name which is the battle group name, and the number of participants are displayed. The chat window W2, the member list W8, and the game rule window W9 are similar to those in FIG. 16. However, in the game rule window W9, the game rules are set up to battle in the round-robin style and, therefore, there is no setting of "change upon termination." A participating member window W12 displays a list of the battle participating members assigned by the host client system 1. A top part W131 of the participating member window W13 displays the number of participants in the round-robin battle, the starting time of the battle, and the finishing time of the battle. A name field W132 shows the names of the battle participating members. In a field of the number of winning games W133, the number of winning games that each member has gained up to the present is displayed. In a score field W134, a star mark is given to a certain number of the top-ranked participating members with excellent scores.

The player data window may be displayed as in Embodiment 1 and Embodiment 2.

In status 50, only when the player of the host client system 1 presses the start button of the control pad 11, the same start menu similar to that as shown in FIG. 11 is displayed (S51). However, it is different in that the start menu M1 has the additional items of "start the game" and "register the participating members in the round-robin battle."

Only the host client system 1 is authorized to change the game rules. When the host player selects "Register the participating members in the round-robin battle," the game server 20 proceeds to the participating member registration status (S52) and displays a round-robin battle participating members registration window W13 as shown in FIG. 23 on the host client system 1. In this window, it is possible to change the registration of the members selected by the host client system 1 from the member list W8 by registering them with any of the fields in the round-robin battle participating member list. The battle form, the number of seconds, the number of sets, the number of stages and the rules are also decided by selection.

If the player of the host client system 1 selects "Start the game" in the start menu, the game server 20 causes each client system 1 to proceed to the battle mode (S54).

Figure 6:
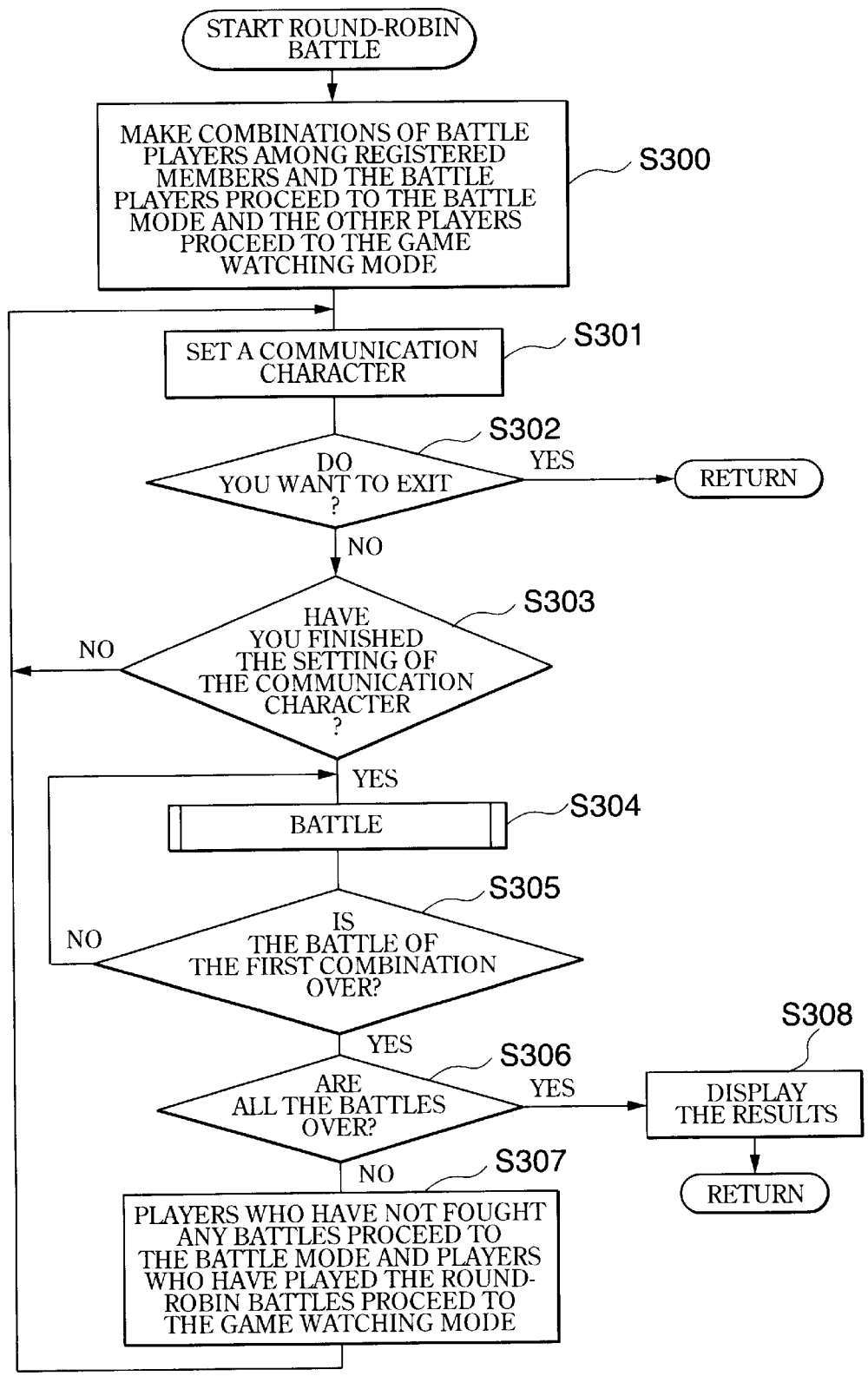
FIG. 6 is a flow chart of a communication game processing method (round-robin battle mode) according to Embodiment 3.

Detailed actions in the round-robin battle mode are hereinafter described based on FIG. 6.

The game server 20 divides the members registered as the battle participating members into a plurality of groups as appropriate and sends a command to proceed to the battle mode to the client systems 1 (S300). The game server sends a command to proceed to the game watching mode to the client system 1 that failed to be included in the first battle because the number of the participating members is odd, and to the other client systems 1. If some client systems 1 participate in the forum later, the game server 20 causes such client systems to participate in the round-robin battle in the game watching mode.

The game server 20 causes the client systems 1 entering the battle mode to designate the characters to be displayed in the battle (S301). The characters are selected, for example, from a plurality of candidates. If the player specifies a particular key operation such as the escape key at the time of the setting of the communication characters (S302: YES), it is possible to exit from the permanent loop and to return to the expert lobby.

When the setting of the communication characters is over (S303: YES), the game server sends a command to start the battle to the client systems 1 which are assigned as the first battle combination (S304). The actions of the respective client systems 1 in the battle mode and the game watching mode and the game server 20 are similar to those in Embodiment 1.

Until the battle of the first combination is over (S305: NO), the battle processing continues. When the battle is over (S305: YES), unless all the battles are over (S306: NO), the round-robin battles continue. In other words, after the game server 20 records the score of the first battle in the field of the number of winning games W133 and the score field W134, it causes each client system 1 to battle with any participating member which has not yet fought, without considering the results of the first battle. There is no limitation on the way of deciding the battle combinations. The battle combinations may be decided in the order listed in the participant list, but it is desirable that the battle combinations be decided by choosing competitors among those who have finished their battles earlier and the next battle be started without waiting for the other combinations to finish their battles because there would be less time loss. If any client system 1 has finished battling with all the other participating members, the game server 20 sends such client system a command to proceed to the game watching mode (S307). The number of winning games and the score are updated every time a battle is over.

Figure 24:
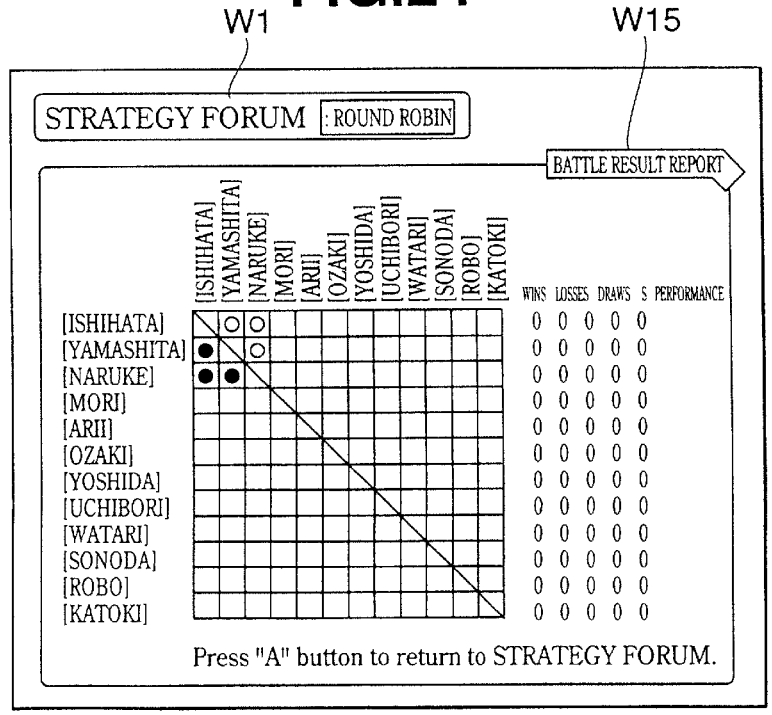
FIG. 24 is a sample display of a score sheet (S55).

If all the battle participating members have finished the round-robin battles (S306: YES), the game server 20 reports the results of the round-robin battles to each client system 1 (S308). The game server 20 displays the win/loss results of the participating members in the format of a score sheet W15 as shown in FIG. 24.

In the same way as in Embodiment 1, the game server 20 judges the ranks around the time when the battle results are displayed. The battle histories are uploaded to the WWW server in the same way as in Embodiment 1.

Accordingly, Embodiment 3 has the effects similar to those of Embodiment 1. Also, since Embodiment 3 is configured to enable the round-robin battle, it is possible to provide such a way of playing the game that remote players compete with each other to find out the superiority and inferiority of their game operating skills by battling with all the players.

Embodiment 4

Embodiment 4 of this invention relates to a communication system for performing a tournament battle in the battle group. The system configuration, hardware configuration, overall processing procedures, and actions of each client system in Embodiment 4 are similar to those of FIGS. 1 through FIG. 3 and FIG. 8 of Embodiment 1 and their corresponding descriptions and, therefore, the descriptions of such configurations and the like of Embodiment 4 are omitted.

The "tournament battle" of this embodiment is a battle mode in which the client systems fight battles in the same battle group in a tournament style. The game server 20 sets up battle combinations in advance by referring to the tournament group information, starts the battles of such combinations from the bottom level, decides the winning client systems of such battles to fight in the next battle combinations, and finally chooses one champion.

A "tournament battle forum" (tournament battle group) is created when the host client system 1 selects the "tournament battle" in the menu M2 of the status S12 of FIG. 3 (FIG. 12). The client system 1 that creates the "tournament battle forum" determines the battle form, the number of seconds, the number of sets, and the number of stages upon the creation of the forum of status S13 in the same manner as in Embodiment 1. Particularly in this forum, the host client system 1 sets up the tournament combinations among the battle participating members in the tournament battle.

A player of the client system 1 who wishes to participate in the "tournament battle" puts the cursor on the icon of the strategy forum in the battle name list W3, where the battle mode is indicated as the "tournament battle," in the expert lobby strategy menu (FIG. 10). The game server 20 searches the expert lobby DB 212 based on the strategy name information, specifies the tournament battle DB 215 which stores the corresponding battle group for the "tournament battle," reads its detailed information, and returns it to the client system 1. In the battle situation reporting window W5 (status S20), when the player performs a particular operation (for example, pressing the A button), the game server 20 determines that the client system 1 has requested to participate in the battle group being selected and registers the client system 1 as a new participant with the battle group (S60). In other words, the tournament battle DB 216 is updated by newly associating the personal information of the client system 1, which requested to participate in the battle, with the group information of the battle group.

Figure 25:
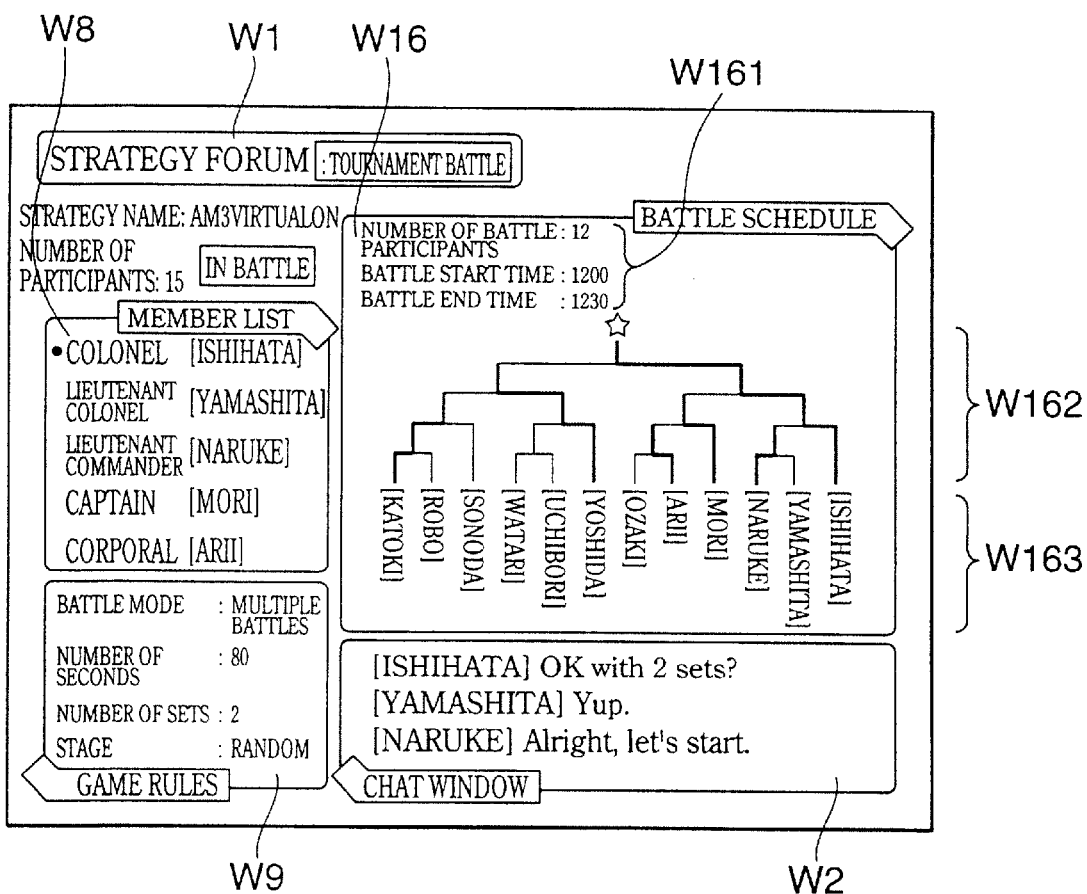
FIG. 25 is a sample display of a tournament strategy forum (S60).

FIG. 25 shows a sample screen display which is supplied to the client systems 1 participating in the "tournament battle" mode. This "strategy forum" is supplied only to the client system (host) which created the battle group, or those who participate in it. The game server 20 makes each display by reading the corresponding record from the tournament battle DB 216.

The battle mode "tournament battle" is shown in the title window W1. Under this title, the status display showing whether it is in battle or not, the strategy name which is the battle group name, and the number of participants are displayed. The chat window W2, the member list W8, and the game rule window W9 are similar to those in FIG. 16. However, in the game rule window W9, the game rules are set up as the tournament battle and, therefore, there is no the setting of "change upon termination." A battle schedule window W16 displays a chart of the tournament combinations decided by the host client system 1. The top part W161 of the participating member window W16 shows the number of participants in the tournament battle, the starting time of the battle, and the finishing time of the battle. In a name field W162, the names of the battle participating members are displayed. A combination display field W162 shows the combinations of the battle participating members in a diagram form. The routes of the remaining winners of the participating members are displayed with bold lines which are not broken, or with different colors.

The player data window can be displayed in the same way as in Embodiment 1 and Embodiment 2. In status 60, only when the player of the host client system 1 presses the start button of the control pad 11, the start menu similar to that as shown in FIG. 11 is displayed (S61). However, it is different in that the start menu M1 has the additional items of "start the game" and "register the participating members in the tournament battle."

Figure 26:
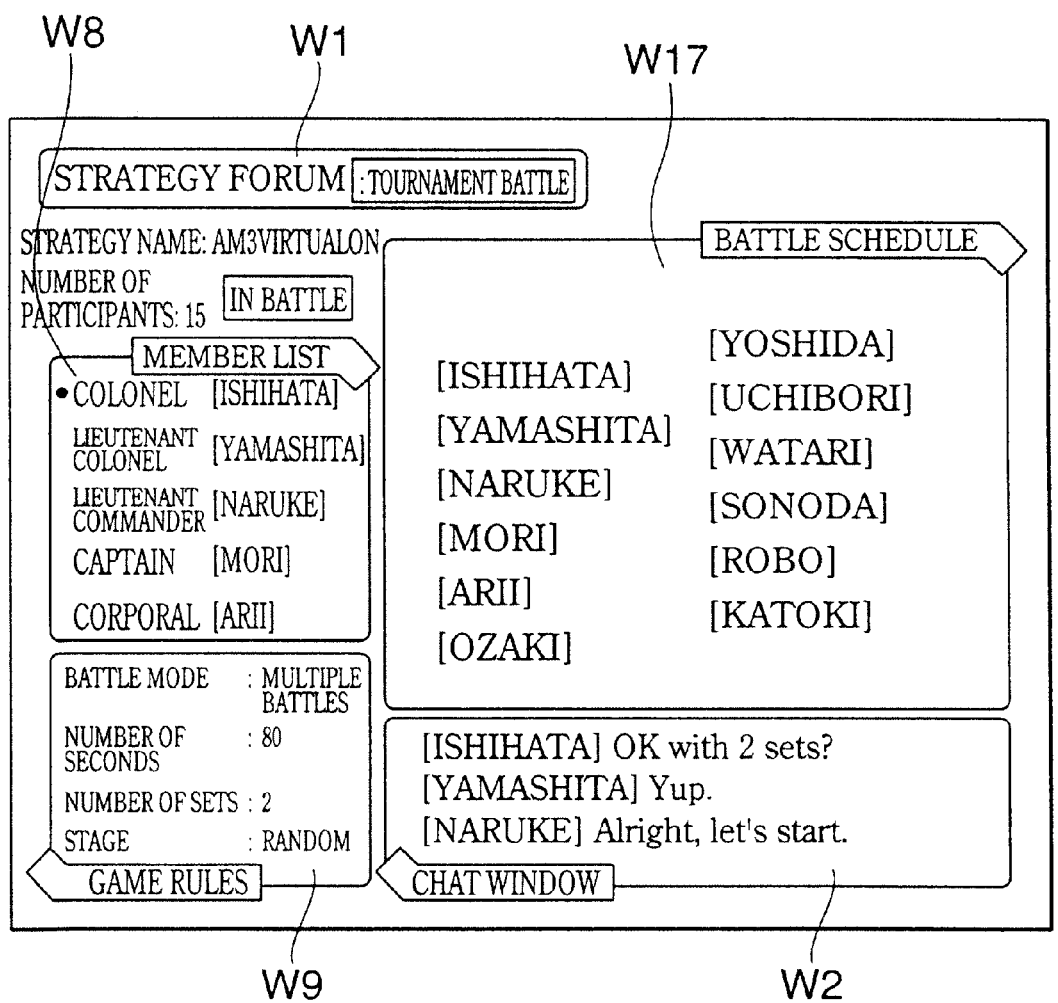
FIG. 26 is a sample display of a participating members registration window (S62)

Only the host client system 1 is authorized to change the game rules. When the host player selects "register the participating members in the tournament battle," the game server 20 proceeds to the participating member registration status (S62) and displays a tournament battle participating members window W17 as shown in FIG. 26 on the host client system 1. In this window, it is possible to change the registration of the members selected by the host client system 1 from the member list W8 by registering them with any position of the name field W163 of the tournament battle schedule window W16. The battle form, the number of seconds, the number of sets, the number of stages and the rules are also decided by selection.

If the player of the host client system 1 selects "start the game" in the start menu, the game server 20 causes each client system 1 to proceed to the battle mode (S64).

Figure 7:
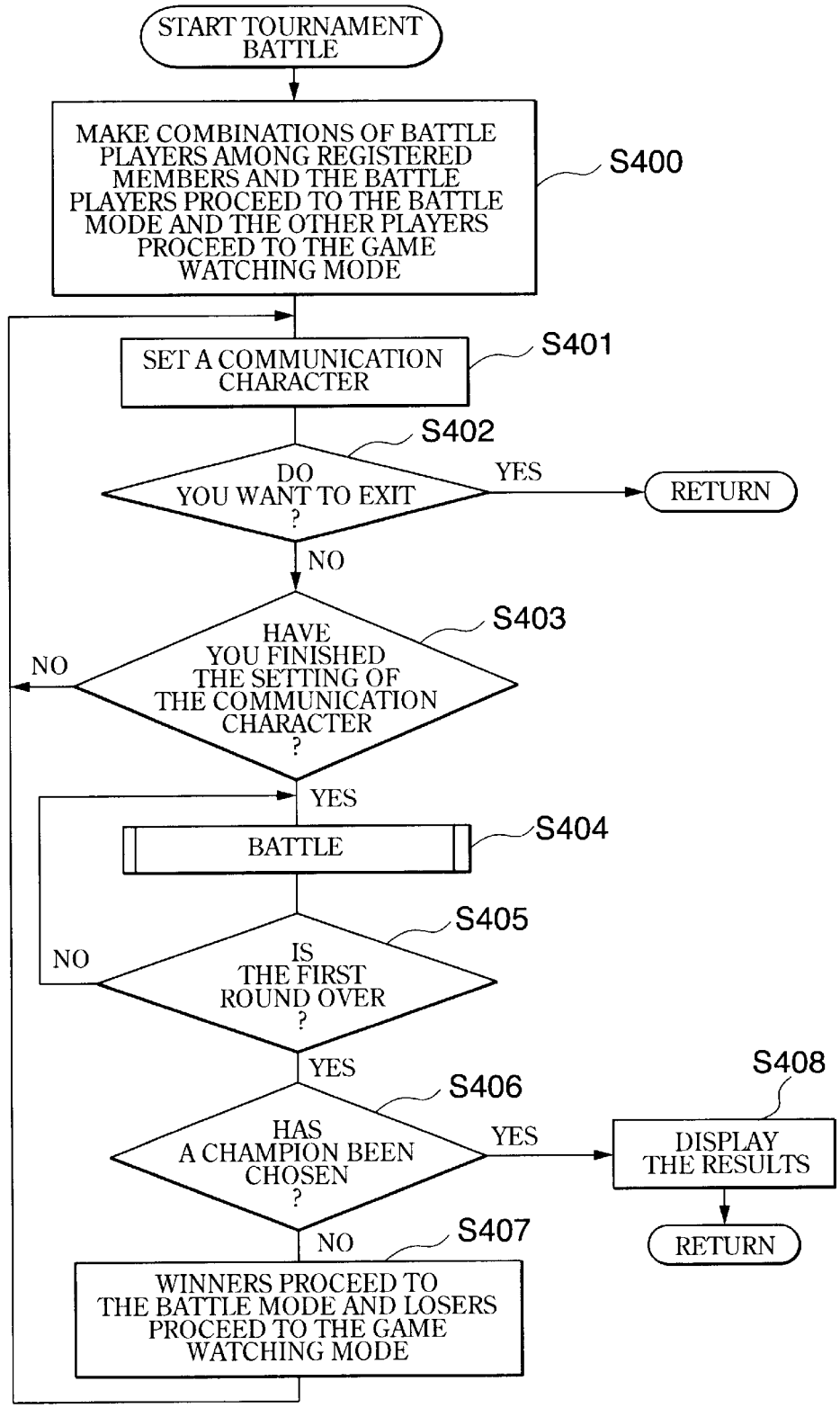
FIG. 7 is a flow chart of a communication game processing method (tournament battle mode) according to Embodiment 4.

Detailed actions in the tournament battle mode are hereinafter described according to FIG. 7.

The game server 20 sends a command to proceed to the battle mode to the client systems 1 of the battle participating members scheduled to battle in the first combination of the tournament (S400). The game server sends a command to proceed to the game watching mode to the client systems 1 which are not participating in the battle. If some client systems 1 participate in the forum later, the game server 20 causes such client systems to participate in the tournament battle in the game watching mode.

The game server 20 causes the client systems entering the battle mode to designate the characters to be displayed in the battle (S401). The characters are selected, for example, from a plurality of candidates. If the player specifies a particular key operation such as the escape key at the time of the setting of the communication characters (S402: YES), it is possible to exit from the permanent loop and to return to the expert lobby.

When the setting of the communication characters is over (S403: YES), the game server sends a command to start the battle to the combinations of the client systems 1 which are to battle in the first round in accordance with the combinations for the tournament battle (S404). The actions of the respective client systems 1 in the battle mode and the game watching mode and the game server 20 are similar to those in Embodiment 1.

Until all battles of the first round are over (S306: NO), the battle processing continues. When the first round is over (S405: YES), unless the final champion match is over (S406: NO), the processing proceeds to the next battles of the tournament. In other words, the game server 20 displays in a specified display manner the routes of the client systems 1, which won in the first round, to extend to the position of the second round. The game server 20 sends a command to the winners of the first round to proceed to the battle mode so that they will battle with each other in the second battle, while the game server 20 sends a command to the client systems which have lost in the first round to proceed to the game watching mode (S407). Such processing (S401 through S407) is repeated until the final champion match is over.

If the final champion match is over (S406: YES), the game server 20 reports the results of the tournament battle to each client system 1 (S408). In other words, the game server 20 makes such display to honor the champion or the second prize winner in the tournament battle strategy forum.

In the same way as in Embodiment 1, the game server 20 judges the ranks around the time when the battle results are displayed. The progress of advancement of the ranks may be accelerated particularly for the champion and the second prize winner. The battle histories are uploaded to the WWW server in the same way as in Embodiment 1.

Accordingly, Embodiment 4 has the effects similar to those of Embodiment 1. Also, since Embodiment 4 is configured so as to enable the tournament battle, it is possible to provide such a unique way of playing the game that remote players can compete against each other to determine the strongest player.

Variations of Embodiment 1 through Embodiment 4

This invention can be applied with various modifications without being constrained by the above-mentioned embodiments. For example, in the above-mentioned embodiments, the typical sports battle forms such as a normal battle, a team battle, a round-robin battle, and a tournament battle are applied, but this invention may be configured so as to enable other battle forms to be applied.

In the above-mentioned embodiments, participants were selected from the battle group, but a battle of the battle mode of this invention may be provided to all the connected players. The battle environment of this invention will be provided to client servers that are connected and apply for participation at the moment when the game server calls for participation. Particularly, in team battles, it is possible to conduct battles between players of specified categories, for example, battles between players of the East team and the West team. Moreover, the tournament battle is a favorable battle form because a national tournament can be conducted.

In the above-mentioned embodiments, the judgment of the ranks is not conducted when the battle combinations are determined in the battle group, but the system may be configured in such a manner that the combination possibilities may be decided according to the degree of strength judged by the battle history information of each client system. In other words, if there are players whose ranks far apart, it is apparent who will win or lose. Therefore, it is possible to make the game server prohibit such a battle.

When the battle combinations are determined in the battle group, each client system may be handicapped based on the battle history information. In this way, battles of the players having equal power are possible, thereby maintaining fairness. In the battles of the handicapped combinations, the system may be configured so as to prohibit the changes of ranks based on the results of the battles as in the aforementioned simulation battles.

The vibration generating processing is performed by a client system according to a command from the game server. However, if the client system is given certain operational conditions, the same effects can be obtained even if the client system is configured to drive the vibration generating means by itself.

Namely, the configuration of the database and the role assignment of the game server system and client systems are not limited to those in the aforementioned embodiments because it is easy to change their designs to recompose the configurations freely according to the system.

Embodiment 5

Embodiment 5 of this invention is hereinafter described according to FIGS. 27 through 35.

A communication game system of this embodiment is characterized by its character selection processing and the configuration of this selection processing is applicable to the above-mentioned Embodiments 1 through 4.

The system configuration and overall processing procedures of Embodiment 5 are almost the same as those of the above-mentioned embodiments and, therefore, their descriptions are omitted and only different parts will mainly be described. The major difference is the character selection procedure in each client system.

Figure 27:
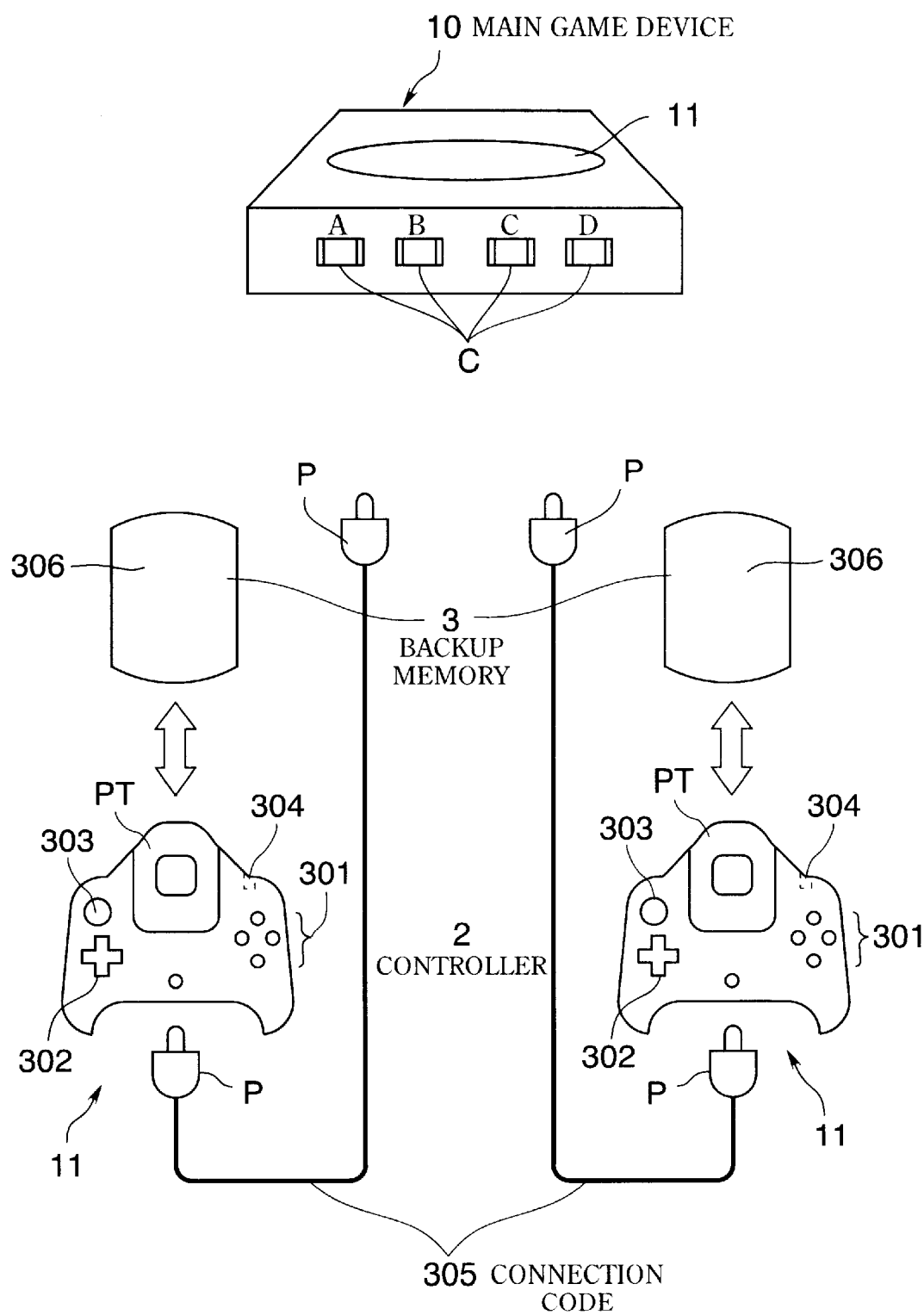
FIG. 27 is a schematic configuration diagram of a main game device according to Embodiment 5.

In order to perform this character selection processing, each client system 1 of this embodiment comprises a control pad 11 shown in FIG. 27.

The control pad 11 has a configuration as a manual operating device operated by each player and comprises an operation button group 301, a cross key 302, an analog direction key 303, and an R trigger switch 304 and can be connected to a main game device 11 with a connection code 305 having a connector P.

Each button of the operation button group 301 is assigned, for example, a quick message which is described in the aforementioned Embodiment 1. This enables the player to send to the main game device 11 the data of the quick message assigned to the button only by operating a desired button of the operation button group 301 during the game. The quick message is transmitted to the competitor client system and the game watching client systems via the game network 40 and is then superposed and displayed on the game screen of their monitor 12.

The control pad 11 is designed to output the pad data to the main game device 10 in the format shown in FIG. 28, when the above-mentioned various operational parts (301 through 304) are operated. Specifically, it consists of the pad data of 16 bits in all. Bits 0 through 13 are assigned to the operation status of the operational parts of the pad and the stick. Bit 14 shows whether the device used is twin sticks or a pad. The last bit 15 is assigned to the bit which reports the end of a customization selection mode at the time of selecting a character, which will be described later. Bit 15 is usually 0, but it is set to 1 when it informs the end of the customization selection mode.

A portable card memory 306 as an external storage medium can be attached in a freely attachable/detachable manner to the control pad 11. Connection ports PT for the card memory 306 are not shown in FIG. 27, but one control pad 11 has two ports. As shown in FIG. 27, the main game device 11 has four ports A through D to which the control pads 11 are connected. Accordingly, up to four control pads can be connected to the main game device 11, where up to eight memory cards 306 can be used.

In this embodiment, the memory card 306 is used to store the data of the character customized (custom-made) at the time of the character selection, which will be described later. A customized character is a character obtained by the player by changing the colors and brightness of the character to his liking, which is prepared in each client system 1 as the default, without changing the shapes of its parts. Accordingly, each client system 1 can have up to eight memory cards, that is, the character data of up to eight customized characters.

By connecting the memory card 306 to the port of the control pad 11, the main game device 10 can read the data of the customized character from the memory card 306, load it on its own RAM, and transfer it to the competitor's client system 1 via the game network 40.

The memory card 306 can be replaced by other storage media such as CD-ROM to load the data of the customized character to the main game device 10.

Figure 29:
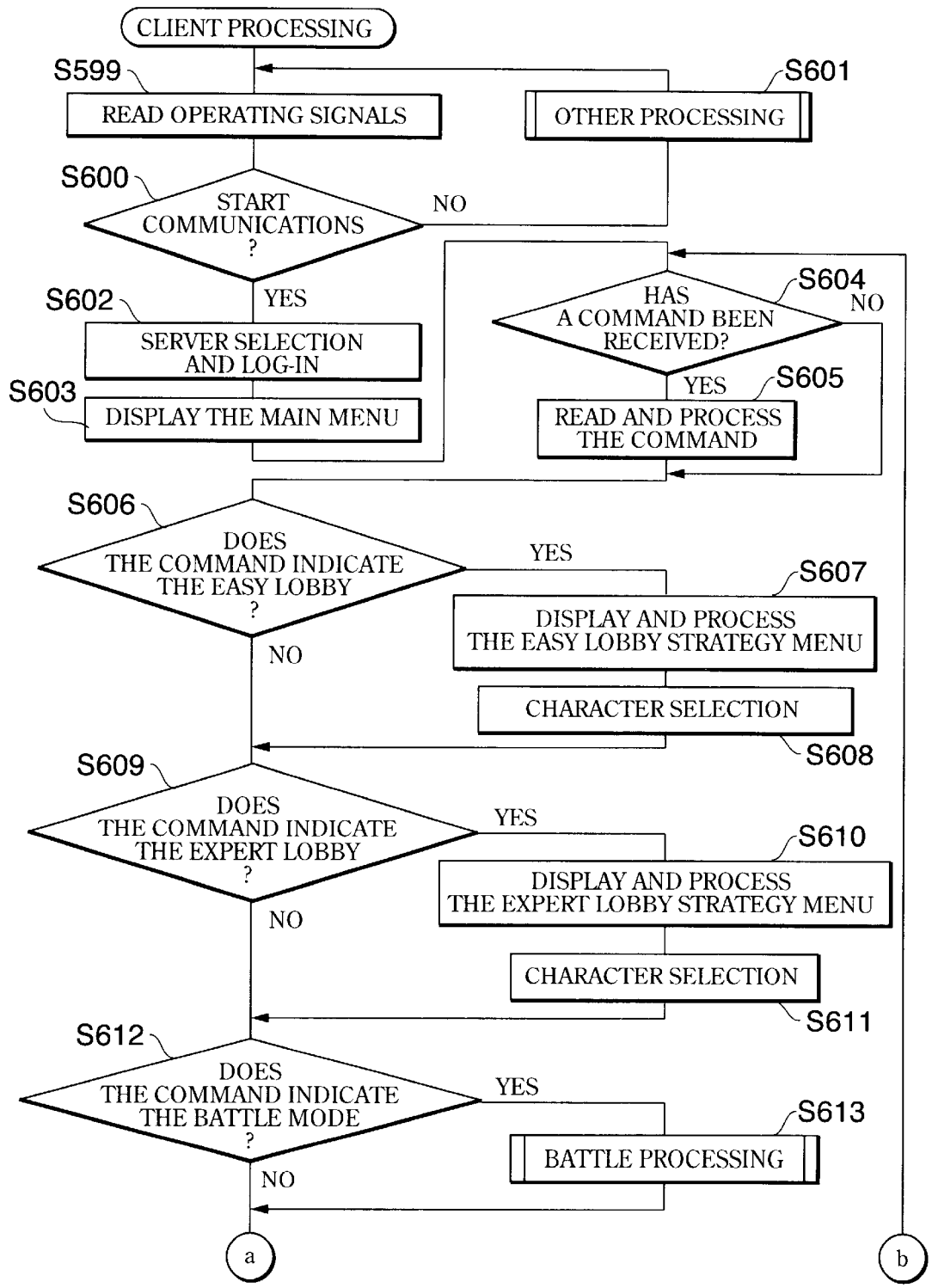
FIG. 29 is a flow chart showing the overview of the character selection together with FIG. 30.
Figure 30:
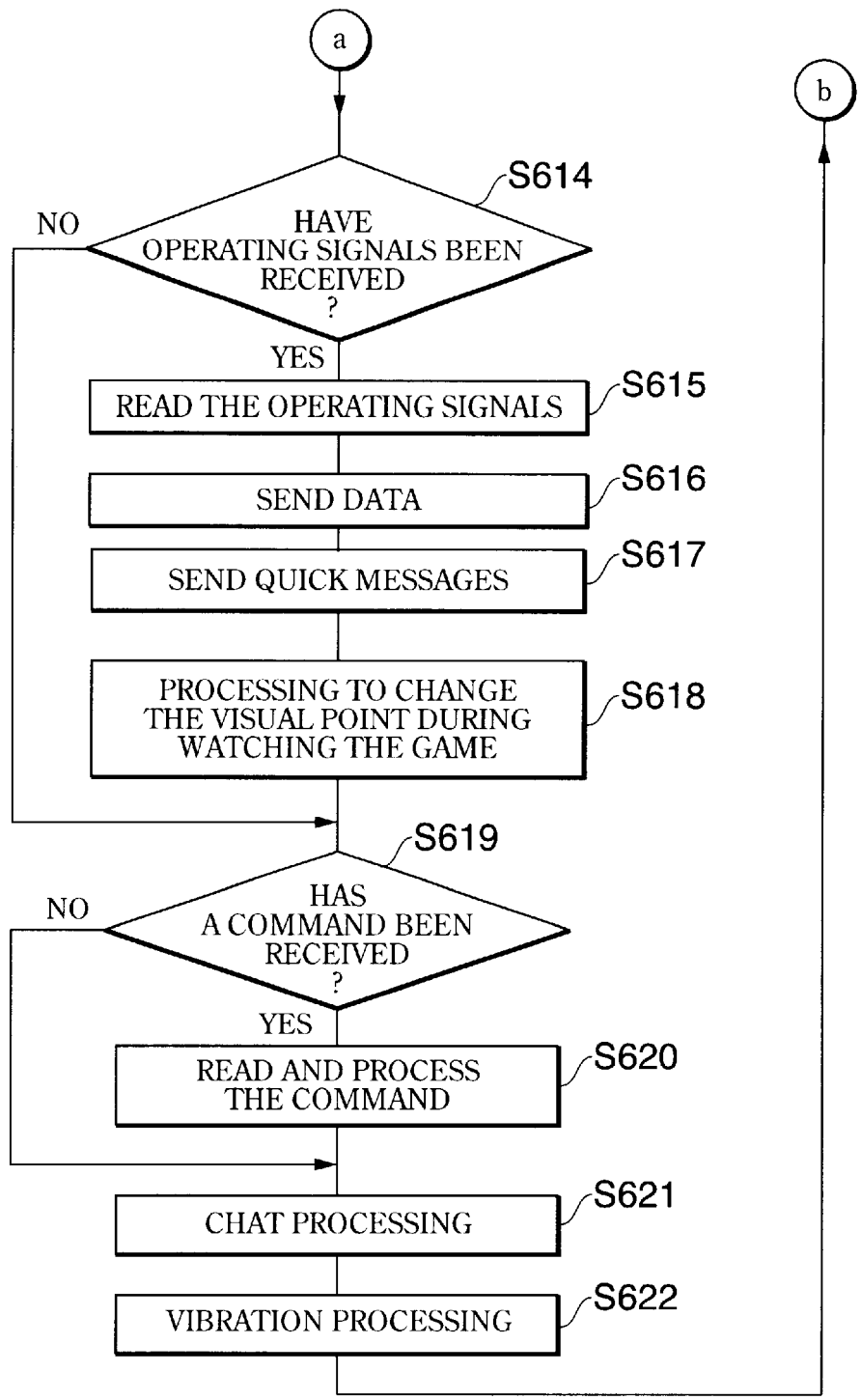
FIG. 30 is a flow chart showing the overview of the character selection together with FIG. 29.
Figure 31:
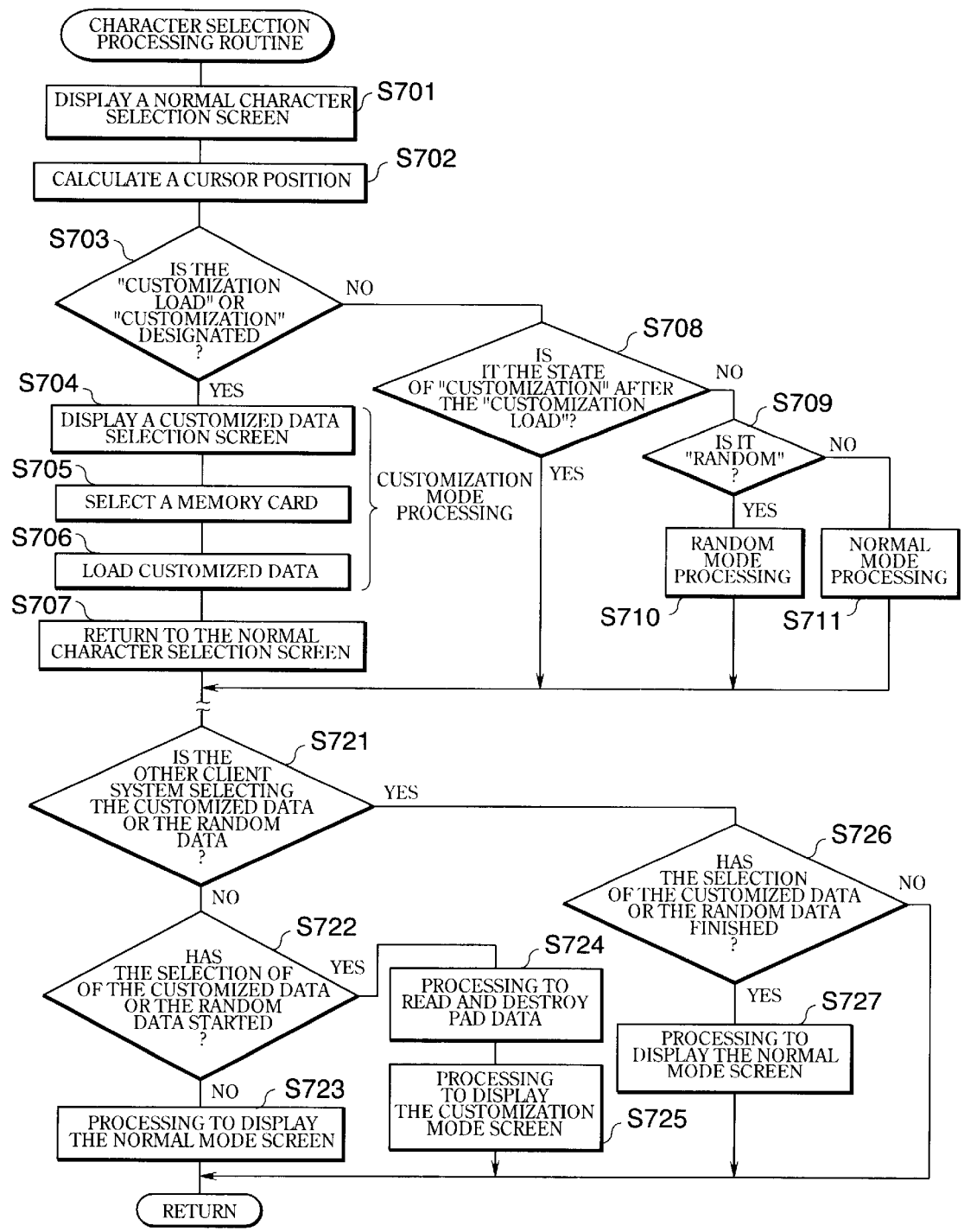
FIG. 31 is a flow chart showing the overview of the character selection processing routine.

FIGS. 29 through 31 show the processing performed at each client system 1 and correspond to FIG. 8 in the above-mentioned Embodiment 1.

Specifically as shown in FIGS. 29 and 30, the main game device 10 of each client system 1 reads the operational signals (S599) and checks whether the details of the operation indicate the start of communications or not (S600) If not the start of communications (S600: NO), it is in the independent mode and the processing continues as a normal stand-alone game device (S601).

On the other hand, if the operational signals indicate the start of communications (S600: YES), the main game device 10 performs the general procedures for establishing the connection in order to conduct the synchronous mode communication. In other words, the main game device 10 selects and calls a preregistered server, and after the connection, sends the necessary information such as its handle name, ID, and password (S602). If it fails to establish the connection, the processor conducts a normal error processing and displays a message to such effect and returns to the original state.

After the connection is established, the main game device 10 displays the main menu (S603), reads a sending command from the game network 40, and interprets it according to the specified command protocols (S604, S605).

Subsequently, when the command indicates to display the easy lobby (easy battle mod) strategy window (S606: YES), the main game device 10 displays the basic screen called the easy lobby strategy window (see FIG. 9) (S607). Moreover, the main game device 10 performs the character selection as described later (S608: see FIG. 31).

Similarly, if the command indicates to display the expert lobby (expert battle mode) strategy window (S609: YES), the main game device 10 displays the basic screen called the expert lobby strategy window (S610). Moreover, the main game device 10 performs the character selection as described later (S611: see FIG. 31).

The expert lobby strategy window mentioned here includes various window displays (the above-mentioned FIGS. 11 through 26) in addition to the basic screen (see FIG. 10 and other drawings). These basic screens are displayed according to the image data stored in the client system. However, the game server system 2 can be configured so that it stores hypertext files for displaying these strategy windows, provides the client systems with such files as necessary, and causes them to be displayed by the hypertext browsing function.

If the command indicates to go to the battle mode (S612: YES), the main game device 10 performs the battle processing according to the image data in the client system instead of the screen display (S613).

Subsequently, if the main game device 10 is provided with operation signals from the control pad 11 (S614: YES), it reads the operation signals (S615) and changes them into commands according to the predetermined command protocols and sends them out to the game network 40 (S616).

If the read operational signals contain the information of a quick message output by one-touch operation of the operation button of the control pad 11, the main game device 10 changes the information into a command and sends it to the game server system 2 via the game network 40 (S617). The game server system 2 sends this quick message to all the client systems 1 of the competitor and game watching players.

Furthermore, if the operation signals contain the information for the change of a visual point of the client systems 1 watching the battle, the main game device 10 changes the visual point of a virtual camera in the game space according to the information and directs in its system the imaging processing of the game space projected from the position of the visual point (S618). Namely, the change of the visual point of the camera functions individually for only the client systems 1 watching the battle.

If a command is sent from the game network 40 (S619: YES), the main game device 10 reads it and interprets it according to the command protocol (S620).

Subsequently, if chat information is sent as a command, the main game device 10 displays character string information based on the chat information on the screen of the monitor 12 (S621). This embodiment is designed to communicate this chat information to all the client systems 1 watching the game, but it may be configured so that only specified game watching client systems 1 exchange the chat information. Even if the client systems 1 fighting in battle receive such information, they are designed to discard it so that the chat information will not distract the player from the battle.

If a vibration command is sent, the main game device 10 performs the processing to cause the vibration generating means 111 of the control pad 11 to vibrate (S622).

The main game device 10 performs the permanent loop processing steps S604 through S622 which do not return to the original state unless any special operation such as the escape is performed.

The above-mentioned character selection routine is hereinafter described according to FIG. 31.

Figure 32:
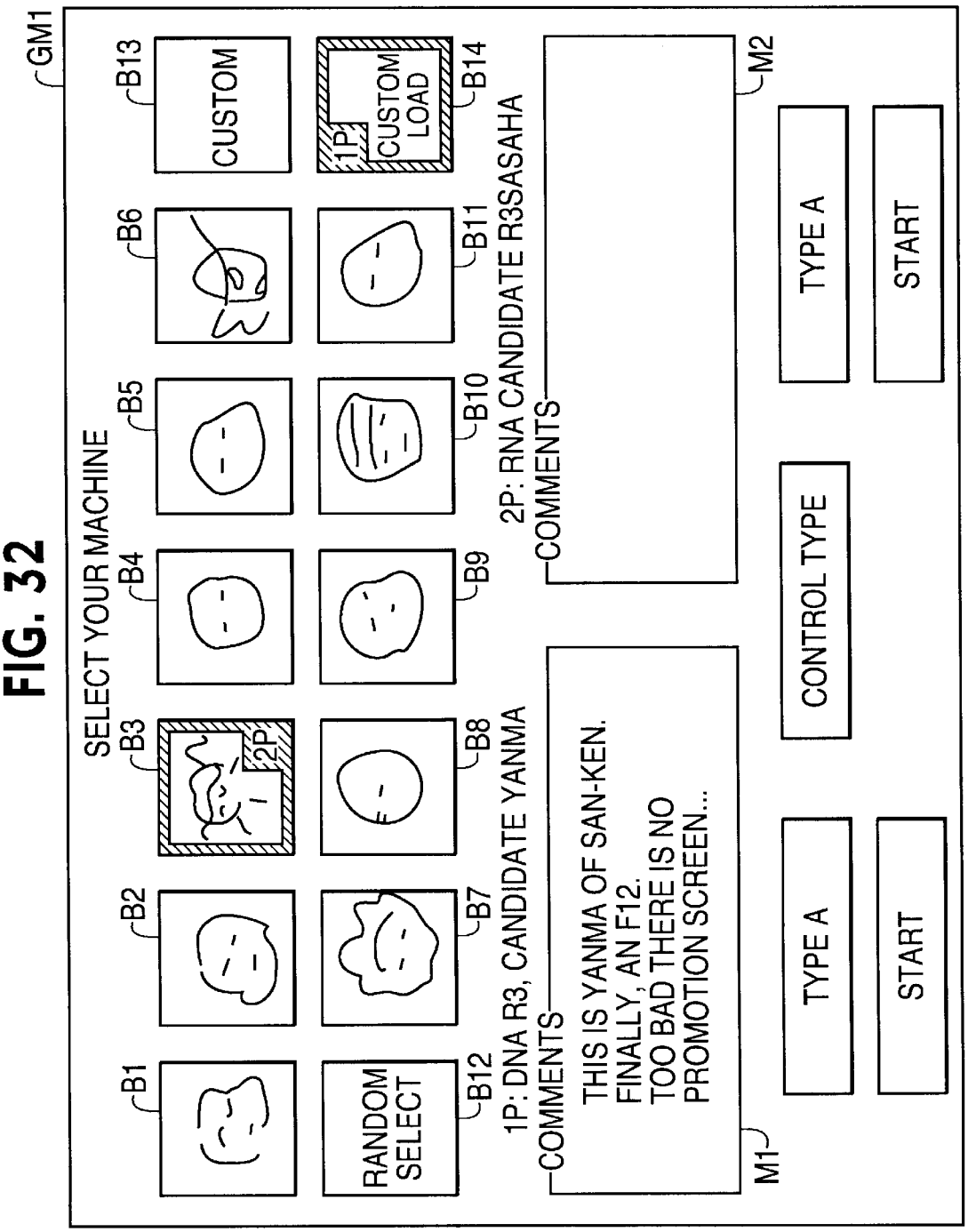
FIG. 32 is a diagram showing an initial screen of the character selection.

In order to allow the player to select his own character, the main game device 10 displays a normal character selection screen GM1 for a normal selection mode (a first selection mode) as the initial screen (S701: FIG. 32). Since this screen display is done between the client systems 1 which are scheduled to battle, both players are expected to first see the common screen GM1 for the character selection. Both players specify their desired characters by selecting the character button on the screen while watching this screen GM1.

As shown in FIG. 32, the normal character selection screen GM1 has, from the center part to the top, buttons B1 through B11 for selecting normal characters (hereinafter referred to as the "normal characters") previously stored in the main game device 10 or the game server system 2 as the default for the normal mode, a "random" button B12 for selecting a character for a random mode, and two buttons, "customization" B13 and "customization load" B14, for selecting characters for a customization mode. The normal character selection screen GM1 has message windows M1 and M2 for displaying the player's own messages and messages from the competitor as well as windows for displaying the necessary game information.

This normal character selection window GM1 is used for selecting the normal characters, but also serves as the button screen for selecting characters of the random mode and the customization mode.

The buttons B1 through B11 are specified in the normal mode. These buttons are the character selection buttons common to all the client systems 1, which are preset as the default. It is possible to designate a character by simply selecting any one of these buttons with a cursor as described later. A desired character can be selected from eleven characters (characters for the battle game).

The button B12 ("random") is to be designated in the random mode. When the button B12 is designated, the CPU of the main game device 10 of the client system 1 prepares a character automatically.

The two buttons B13 and B14 ("customization" and "customization load") are designated selectively in the customization mode. When either of these buttons is designated in the state where no character data is loaded, the procedure starts to load the customized character data from the memory card 306 attached to the control pad 11.

Subsequently, the main game device 10 calculates the positions of a 1P cursor (the player's own character selection cursor) and a 2P cursor (the competitor's character selection cursor) placed on the normal character selection screen MG1. This cursor position is generated as the pad data and is sent to the competitor via the game server system 2. The cursor position can be changed arbitrarily by operating the control pad 11. The player's own cursor 1P is displayed, for example, as a green frame around any one of the buttons B1 through B14 on the player's own normal character selection screen MG1. The 2P cursor data of the competitor is sent via the game network 40 and is displayed, for example, as a red frame around any one of the buttons B1 through B14 on the player's normal character selection screen MG1.

On the normal character selection screen MG1 as illustrated in FIG. 32, the 1P cursor is placed on the "customization load" of the button B14 and the 2P cursor is placed on the button B3.

The main game device 10 then judges whether the "customization load" or the first "customization" is designated according to the position of the 1P cursor on the screen.

If such judgment clarifies that the "customization load" or the first "customization" is designated, a customization data selection screen GM2 is displayed (S704: see FIG. 32). As illustrated in FIG. 33, the customization data selection screen GM2 presents characters A through D for the four ports of the main game device 10 and windows A1, A2, B1, B2, C1, C2, D1, and D2 imitating the memory card 306 belonging to each port. The windows indicating the position where the memory card 306 is actually mounted is displayed with higher brightness (the corresponding windows in FIG. 33 are diagonally shaded). In this case, FIG. 33 shows that the memory card 306 is attached respectively to ports B1 and B2 of the control pad 11 connected to port B of the main game device 10.

The main game device 10 designates the desired memory 306 via the button of the control pad 11 (FIG. 31: S705). In this example, either of the memory cards 306 at ports B1 and B2 is designated. When this designation is done, the character data is loaded from the memory card 306 of the designated port onto the main game device 10 (S706) The processing of steps S704 through S706 correspond to the customization mode processing. After this, the screen returns to the normal character selection screen GM1 (S707).

On the other hand, if the judgement of the step S703 is NO, the main game device 10 judges whether the button selection indicates the status of "customization (button B13)" after the "customization load (button B14)" is performed once (S708). In this case, the customization mode processing of steps S704 through S706 is omitted because the character data of the desired character has already been loaded in the RAM of the main game device 10.

While both "customization load (button B14)" and "customization (button B13)" are used to designate the customization mode, the "customization (button B13)" allows the reset of the character to be done easily with one touch when the data of such customized character has already been loaded. However, when the data of the customized character has not yet loaded and has to be newly designated, pressing either the "customization load (button B14)" or the "customization (button B13)" performs the new processing including the customization mode processing of steps S704 through S707 (S703).

If the judgement of step S708 is NO, the main game device 10 determines whether the selected button is the button B12 "random" or not (S709). If it is determined that "random" is designated, an appropriate random mode processing is performed in which the computer presents an automatically set character (S710), and the character data is loaded in the VRAM of the main game device 10.

If the judgement of step S708 is NO, the button selected on the main game device 10 is any one of the normal mode buttons. For example, in FIG. 32, the selected button should be one of the buttons B1 through B11. The main game device 10 then determines the designated button and performs the processing to load the data of the normal character assigned to such button into its VRAM (normal mode processing) (S711).

While the character selection is conducted as described above, a communication device 101 of the main game device 10 periodically performs two-way synchronous communications with the game server system 2 via the game network 40.

The cursor position information on the screen GM1 calculated in step S702 and the character data loaded in the VRAM are sent to the game server system 2 via the game network 40. This character data is sent to and stored in the competitor's client system 1 and is used to display the game screens of the battles to take place subsequently. On the contrary, the character data and information that the competitor client system 1 sends to the control of the game server system 2 via the game network 40 are also received by the communication device 101 of the main game device 10 as occasion arises and periodically, and are downloaded in the main game device 10.

The main game device 10 then judges whether the competitor's client system is in the process of selecting the character data for the customization mode (customized data) or the character data for the random mode (random data) on the basis of the cursor position on the normal character selection screen MG1, which is contained in the received information (S721). If the judgement is NO, the main game device 10 then judges whether the selection of the customized data or the random data has started or not similarly on the basis of the cursor position (S722). If this judgement is also NO, it is possible to tell that the normal mode has been designated, so the main game device 10 commands the processing to display the normal mode screen.

In the case of the normal mode screen display processing, the character selected by the competitor is the normal character and, therefore, the processing is directed to position the 2P cursor on the button corresponding to the cursor position.

On the other hand, if the judgment of step S722 is YES, it indicates that the competitor has started to the selection of the customized data or the random data. In other words, it is the moment when the button "random", "customization load", or "customization" is designated. Consequently, the main game device 10 directs the processing to read and discard the cursor position (pat data) to be received thereafter (S724). Namely, such processing (i.e., nullification processing) is directed to read the pat data, but to discard it without any change and without performing the display processing.

Subsequently, the main game device 10 directs a customization mode screen display processing to replace the discarded pat data by the cursor position (pat data) that was used immediately before the discard processing started (S725). Therefore, while the discard of the cursor position continues, i.e., while the competitor continues the selection processing of the random mode or the customization mode, the position of the competitor's 2P cursor displayed on the normal character selection screen MG1 does not change, with the help of the judgement of the below-mentioned step S726.

Moreover, the main game device 10 judges whether or not the selection of the customized data or the random data is over according to the binary value of the bit 15 of the aforementioned pat data (S726). If the judgement is NO, this selection is considered to continue and the processing to read and discard the pat data and the customization mode screen display processing continues (S724, S725).

If the judgement of step S726 is YES, the selection of the customized data or the random data is over and, therefore, the processing returns to the processing to display the normal mode screen (S727).

The character selection in this embodiment is performed as described above, so it is possible to load the character data not only in the normal mode, but also in the customization mode and the random mode in the natural screen state and in the state where the game performance is secured.

In other words, if one fighting player specifies the mode on the screen, the processing to read and discard (nullify) the received cursor position or pad data causes the 2P cursor indicating the competitor's selected character to be fixed to the "customization load", "customization", or "random" button on the other player's screen and the 2P cursor does not move until the character selection in such mode is terminated. This enables the latter player to recognize that the former player performs the character selection in the customization mode or in the random mode. At this time, the cursor does not move unnaturally inconsistent with the contents of the screen, thereby causing no sense of abnormality. On the other hand, when the players know the other player's strategies, unnatural movements of the other player's cursor may suggests the character that the other player is going to select. However, the other player's cursor does not move in the above-mentioned modes, thereby raising the players' expectations of the game.

As described above, it is unnecessary to change the format of the sent and received data only for specific processing such as the character selection, and such easy nullification processing to read and discard the data, which one player does not want to be displayed on the other player's side, after receiving such data can make it possible to maintain the consistency of the sending and receiving processing for the real-time synchronous communications.

Sample game screens which are obtained by this character selection are schematically shown in FIGS. 34 and 35. These game screens are the screens that out of the twelve players who have gathered through the expert lobby strategy window, for example, the two players who are decided to battle according to the relevant game form, and the remaining ten game watching (waiting) players can watch.

FIG. 34 is a sample game screen that one of the two players in battle watches from its monitor 12. This game screen displays the game space with the visual point of the camera placed above the head of one player's character and the two characters C1 and C2 that have been selected from the above-mentioned character selection processing face each other. At the positions close to the lower right and left corners of this screen, emblems EB1 and EB2 of the two players are displayed together with their identification numbers ID1 and ID2. At the position close to the lower center of the screen, a quick message window WDa is displayed. This quick message is sent to and displayed at not only the competitor, but also all the client systems 1 watching the battle. Since quick messages can be displayed by easy operation, they hardly interfere with the game operations and can augment the atmosphere of the game. Moreover, this game screen displays a window WDb for showing the remaining time, and life gauges LG1 and LG2 for showing the remaining power of the two characters.

FIG. 35 is a sample game screen that a player watching the game can watch from its monitor 12. This game screen displays another game space with the visual point of the camera placed at an arbitrary position in the game space. The difference from FIG. 34 is that the screen displays a window WDc for displaying the mode of the present visual point of the camera at the position close to the lower left corner of the screen, and a window WDd for displaying the chat information among the game watching players at the upper part of the screen.

On the screen of those watching the game, since they can watch the game from an arbitrary camera visual point of each client system 1, the mode of the camera visual point at that moment is displayed.

The chat information is displayed in the window WDd to which semitransparent processing has been applied. This enables the game watching players to exchange their views about the present state of the game through this window without giving almost any effects on the game screen. Therefore, it is possible to enhance such togetherness that the players are participating in the game together, and to make the players become more interested in and less bored with the game. Since this chat information can be exchanged only among those watching the game and is not shown to the fighting players, it is possible to prevent such detrimental effects of distracting the players from the game.

When a client system 1 is allocated to the battle mode, the main game device 10 not only moves its character according to the operational signals, but also changes the position and status of the competitor's character according to the operational commands provided by the game network 40. Allocations of the operational commands can be decided for each game. Such processing enables a player to play the game battle as if he battles with another player by connecting two control pads 11 to one game device.

On the other hand, when a client system 1 is allocated to the game watching mode, the main game device 10 moves the two characters in battle according to the operational commands provided by the game network 40 and changes its display status. At this time, the game screen that the player is watching can be modified easily for a desired position and angle when the player operates the switch of his control pad 11 (see FIG. 35).

This visual point changing processing enables the game watching players to easily obtain the images viewed from every position in the game space. This allows the players to observe the progress of the game in more detail, to enjoy a more realistic feeling of the game, and to feel as if they are a part of the game. Therefore, even those who are only watching the game become more interested in the game and rarely become bored.

In addition, since the client systems 1 allocated to this game watching mode can chat with each other, the players can watch the games as if they are cheering on their friends playing a battle game at an amusement arcade.

In the above-mentioned embodiment, the nullification processing for the display by reading and discarding the received data has been described in relation to the character selection processing. However, this invention is not limited to such use and the nullification processing may be applied in the case where the respective client systems express different game scenes.

In each of the above-mentioned embodiments, as the method for providing the client systems with images and sounds, the client systems store basic image data, sound data, and program data for operating such image and sound data, and the game server sends commands to operate the data and programs in order to operate the client systems.

However, such configuration may be adopted so as to enable direct provision of images and sounds from the game server by allowing the hypertext files to be browsed. For example, it is desirable from the point of view of easy information update and distribution of loads on the devices that only the files of the window screens of, for example, strategy forums be browsed.

A variation of Embodiment 5 is hereinafter described. This variation relates to the processing of the above-mentioned chat information. In the above descriptions, it is stated that the chat information is exchanged only between the game watching client systems and the chat information to the fighting players is nullified. In this variation, the chat information is exchanged in a broader manner. The chat information is digital information which is exchanged in real time between the client systems for the purpose of conversations and contains voice information in addition to the aforementioned character string information. The voice information is sent over the Internet telephone or sent after being converted into voice files.

This variation is unique in that it allows the exchange of the chat information between those watching the game and the fighting players. In some cases, even the fighting players can enter the chat information through their client systems. For example, the fighting players can send the character string information to those watching the game during game stages. The fighting players can send in real time the voice information to those watching the game even during the battle game. Those watching the game can always send the chat information to the fighting players.

In order to achieve this variation, in the client systems in the game watching mode, the following three modes can be set for the processing means and the processing system: (1) a mode in which the chat information can be exchanged only with those watching the game; (2) a mode in which the chat information can be exchanged with all the fighting players; and (3) a mode in which the chat information can be exchanged only with specified fighting players. The client system cannot select mode (2) and mode (3) at the same time, but can select either plural modes or a single mode. The mode (1) is set as the default in the game watching client systems.

On the other hand, in the client systems fighting battles, any one of the following three modes can be set: (4) a mode in which the chat information can be exchanged with all the game watching client systems; (5) a mode in which the chat information can be exchanged only with specified game watching client systems; and (6) a mode in which no chat information can be exchanged with any game watching system. The mode (6) is set as the default for the fighting client systems. However, those watching the game can change the mode before and during the battle game.

The mode setting information of the game watching client systems or the fighting client systems is sent to the server system. The processing means of the server system stores the combinations of the game watching client systems and the fighting client systems that can exchange the chat information according to the mode information by storing the information to specify the client systems in the form of a storage table in a particular storage area of the storage means. The game server system refers to this information table and conducts the information processing so that chat information can be exchanged between the client systems in the above-mentioned combination relationship. It is within the scope of the effective variation that when the chat information is sent to a client system having no combination relationship, the client system nullifies the chat information.

The system herein described will enhance the attraction of the network game involving the game watching players and the fighting players in the following cases. For example, a specified game watching player and a fighting player form a combination, thereby exchanging chat information only between the two. This is equal to the case in which the specified game watching player and fighting player jointly work on, for example, their strategies to play the battle game against the other player.

Moreover, such configuration is possible that the conversational information of a particular player or between particular players is displayed selectively. Such another configuration is also possible in which the player himself does not participate in the chat but watches and hears the chat information between particular players.

Since this invention enables an unlimited number of client systems to form a group, it is possible to provide a wide variety of ways to play the game that could not be provided by the conventional communication systems, to facilitate the communications between the players, and to make the communication game more entertaining.

In particular, the configuration of this invention can satisfy the demand of the players to play the game mainly with those who can be called friends of kindred spirits on the network in the communication game environment where a multiplicity of any persons participate.

The configurations of this invention can also satisfy the demand to enable a player to use his own skills in a variety of battle combinations such as team battles, round-robin battles, and tournament battles that are normally performed in games and competitions where many people participate.

Furthermore, this invention can satisfy the demand to watch other players fight battles, even when the player himself is not fighting the battles. For example, this invention can facilitate such active communications between the game watching players that could not be provided by the conventional communication game system. Accordingly, even the game watching players can feel as if they are a part of the game, thereby making the communication game more entertaining.

Furthermore, this invention can provide such a communication game which will not give any sense of abnormality upon the operation to select the character to be used in the battle game and which will maintain the excitement of the game.

What is claimed is:

1. A communication game system comprising:
   a game server system; and
   a plurality of client systems formed in a single group and communicatively coupled with the game server system, wherein each of the plurality of client systems is configured to selectively send and receive messages to any client system and further comprise:
   communicating device for receiving chat information created by a first game watching player, which is sent by the game server system, and further for sending chat information, created by a second game watching player, to the game server system, wherein the received chat information and the sent chat information relate to a contemporaneously ongoing game being played by fighting players; and
   display means for superposing the selectively sent and received messages on a game screen corresponding to the client systems, superposing the received chat information on a game screen corresponding to the game watching player, and superposing messages created by one or more fighting players on a game screen corresponding to the fighting players while not superposing the received chat information on the game screen corresponding to the fighting players.

2. The communication game system according to claim 1, wherein the display means displays the received chat information in a semitransparent window which is set up on the background of the game screen.

3. The communication game system according to claim 1, further comprising: means for exchanging dialog information only between the clients systems in a game watching state of a battle game.

4. A communication game system comprising:
   a game server system; and
   a plurality of client systems formed in a single group and communicatively coupled with the game server system, wherein each of the plurality of client systems is configured to selectively send and receive messages to any client system and further comprise:
   a communicating device for receiving chat information created by a first game watching player, which is sent by the game server system, and further for sending chat information, created by a second game watching player, to the game server system, wherein the received chat information and the sent chat information relate to a contemporaneously ongoing game being played between fighting players;
   display means for superposing the received chat information on a game screen corresponding to the same watching player, and superposing messages created by one or more fighting players on a game screen corresponding to the fighting players while not superposing the received chat information on the game screen corresponding to the fighting players; and
   means for exchanging the selectively sent and received messages only between a client system in a game watching state of the game and a client system which is presently furthering the game.

* * * * *